Oct. 6, 1970 K. A. BELL ET AL 3,533,077

ADDRESS MODIFICATION

Filed Nov. 8, 1967 23 Sheets-Sheet 1

INVENTORS
KENNETH A. BELL
LELAND D. HOWE JR.
THOMAS A. METZ

BY Ronald J. Clark

ATTORNEY

Oct. 6, 1970 K. A. BELL ET AL 3,533,077

ADDRESS MODIFICATION

Filed Nov. 8, 1967 23 Sheets-Sheet 5

Oct. 6, 1970 K. A. BELL ET AL 3,533,077

ADDRESS MODIFICATION

Filed Nov. 8, 1967 23 Sheets-Sheet 6

Oct. 6, 1970 K. A. BELL ET AL 3,533,077

ADDRESS MODIFICATION

Filed Nov. 8, 1967 23 Sheets-Sheet 7

Oct. 6, 1970 K. A. BELL ET AL 3,533,077

ADDRESS MODIFICATION

Filed Nov. 8, 1967 23 Sheets-Sheet 13

Oct. 6, 1970 K. A. BELL ET AL 3,533,077

ADDRESS MODIFICATION

Filed Nov. 8, 1967 23 Sheets-Sheet 20

United States Patent Office 3,533,077
Patented Oct. 6, 1970

3,533,077
ADDRESS MODIFICATION

Kenneth A. Bell, Rochester, Minn., Leland D. Howe, Jr., Owego, and Thomas A. Metz, Endicott, N.Y., assignors to International Business Machines Corporation, Armonk, N.Y., a corporation of New York Filed Nov. 8, 1967, Ser. No. 681,465
Int. Cl. G06f 9/20
U.S. Cl. 340—172.5 1 Claim

ABSTRACT OF THE DISCLOSURE

The present invention is directed towards a mechanism for automatically updating in parallel the data address for the next data access concurrently with the current data access. More specifically, in a sequentially operating central processing unit operating to sequentially address and process adjacent words of a multi-word variable length record, the address of the next word is generated during the processing of the current word. In a system employing a multi-unit address and employing a single unit ALU, an additional scheme must be employed to modify the available address to retrieve the next desired data word.

CROSS REFERENCE TO RELATED APPLICATIONS

An address modification unit, which the present invention replaces, is disclosed in U.S. Pat. 3,387,283 entitled "An Improved Addressing System" in the name of M. C. Snedaker, Ser. No. 525,464, filed Feb. 7, 1966, and assigned to the assignee of the present invention.

SUMMARY OF THE INVENTION

In a data processing system employing a multi-unit address to address the next data sub-unit, the address must be changed for each data unit retrieval. Normally, it requires a machine cycle to process a single sub-unit of information, whether it be data or an address. However, processing speeds would suffer if three machine cycles were required to update a three sub-unit address. Accordingly, to improve the operating characteristics of the subject central processing unit, a mechanism is disclosed whereby each unit of a multi-unit address is automatically and simultaneously modified under certain specified conditions. Selected sub-units of the multi-unit address are gated into a predetermined destination according to the carry output signals from the ALU or other detectors. The carry output signals or the detectors indicate when the sub-unit of the multi-unit address requires a carry over to the next adjacent higher position.

The foregoing and other objects, features and advantages of the invention will be apparent from the following more particular description of a preferred embodiment of the invention, as illustrated in the accompanying drawings.

DETAILED DESCRIPTION OF THE DRAWINGS

Figure 1:
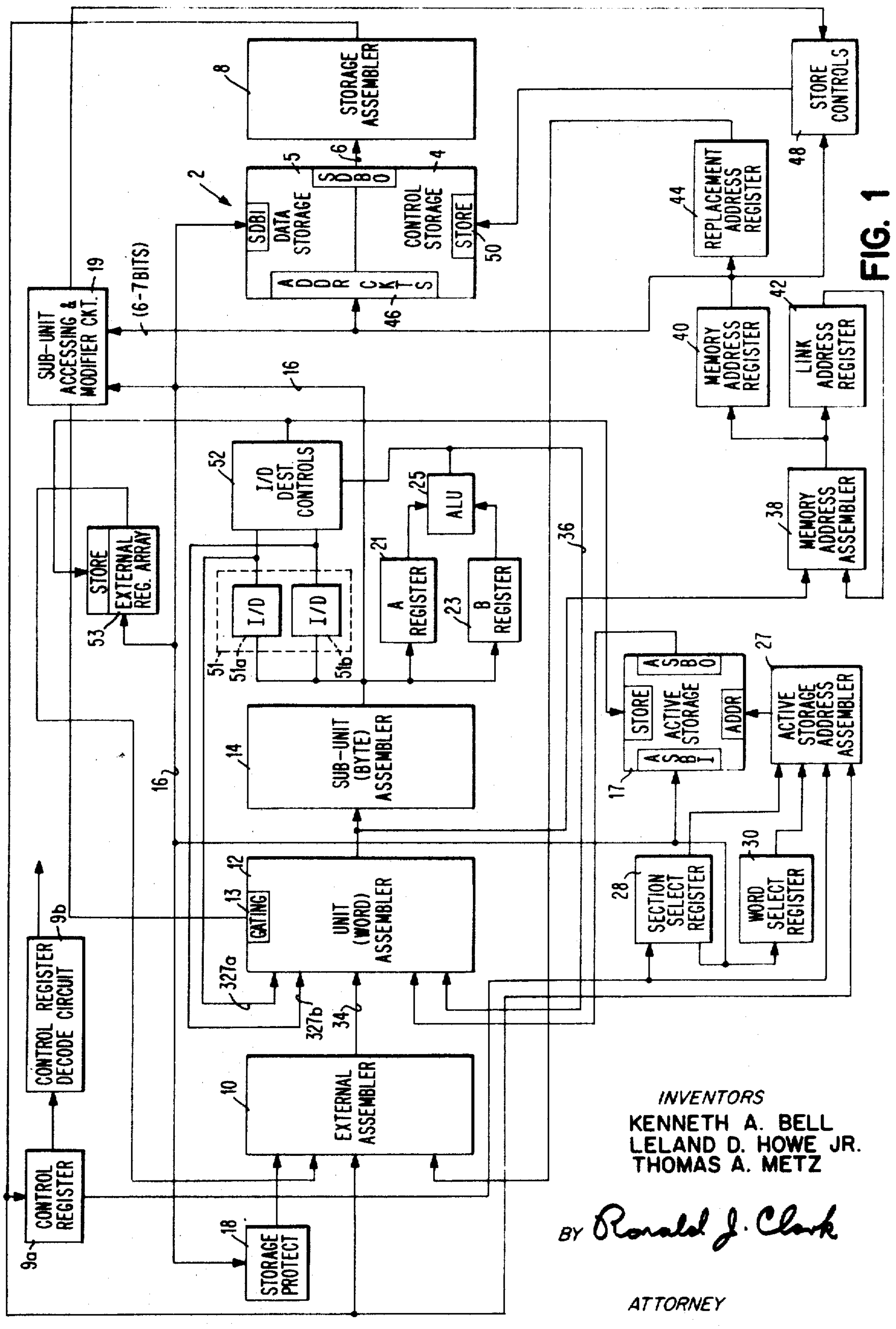
FIG. 1 is a generalized block diagram of the invention.

Referring to FIG. 1, there can be seen a block diagram of a data processing system which can advantageously employ the present invention. A main storage circuit 2 is of standard design employing cores, transistor stages, or any other well-accepted storage medium as the mechanism for storing an individual bit in a storage word. The words employed in the present environment comprise four individual bytes of data. Each of the bytes comprises eight binary bits of information and one bit of information is held in one storage element. Therefore, upon each access to the main storage circuit 2, 32 bits of information are interrogated from or written into the 32 corresponding storage elements. The main storage circuit 2 performs a second function and that is to store the control words in a control storage area 4 integral with a data and program information storage area 5. As is well known in the technique of microprogramming as disclosed in U.S. Pat. 3,400,371, the purpose of the control words is to control the logic manipulation within the remaining circuit elements of the central processing system whereby the data contained in the data storage subsection 5 is effectively processed. The above mentioned patent shows the storage of control words in a separate storage device as distinguished from the present system which incorporates the control word storage into the same storage device as the data and problem program.

All information read from main storage is placed on a storage data bus out 6 which transfers the words of information from main storage 2 to a storage data bus out assembler 8. The output of the assembler 8 is applied to a control register 9*a* and subsequently to a control decode circuit 9*b* and directly to an external assembler circuit 10. Control words read from the control storage area 4 are placed in the control register 9*a* and then decoded to bring up the proper gating and branching lines to perform the function indicated by the control word. Data or instructions read from the data storage area are gated into the external assembler 10. The data flow from the assembler 10 is thereafter under the control of the particular control word in command. Depending upon the particular control word presently being executed, the data is gated into a unit or word assembler 12 and thereafter selectively gated in response to a gating circuit 13 into a sub-unit or byte assembler 14. A byte has previously been indicated as being eight binary bits and is hereafter equated to the term "sub-unit." A sub-unit is a basic unit of data and can be of any desired size depending on the system design. It is also a basic unit of data which can be selected and manipulated through the data transfer paths and arithmetic unit. The output of the sub-unit assembler 14 forms a main data bus 16. The main data bus 16 transfers words from the assembler 14 to an active storage circuit 17, an external register 18, a sub-unit accessing register and modifier circuit 19, and a pair of input registers 21 and 23. The registers 21 and 23 form the inputs to an arithmetic logic unit 25. The bus 16 forms an input to the main storage unit 2. The active storage unit 17 is a separate storage unit unrelated to main storage and comprises transistor storage elements for the storage of data. The selection of the transistor as the storage element is prompted out of the requirement that active storage have as fast an access time as is possible. The addressing of the active storage circuit 17 is accomplished by an active storage address assembler 27. The assembler 27 receives information from a plurality of sources including a section select register 28, a word select register 30, the storage assembler 8, the control register 9*a*, and the decode circuit 9*b*. The active storage X and Y drive lines are the output of the assembler 27. Data is fed into the active storage circuit 17 from the main data bus 16 and is read from active storage onto an active storage bus out 32 and is entered into the unit assembler 12.

The external assembler circuit 10 is a group of gating circuits that receive data words from the storage assembler 8 and a group of hardware registers, one of which is shown at 18. The output of the external assembler 10 is an external assembler bus out 34 which is applied to the unit or word assembler 12.

The unit assembler 12 is divided into four sets of latch type circuits; each set may hold one byte of data. The input to the word assembler 12 is from the external assembler 10, active storage bus out 32, and an arithmetic bus 36. The output of the unit assembler 12 is applied to the sub-unit assembler 14 and a memory address assembler 38. The output of the memory address assembler 38 is applied to a memory address register 40 and a link address register 42. The output of the register 40 is applied to a replacement address register 44 and to an address circuit 46 in main storage 2. The output of the register 40 is applied to a store control circuit 48 which in turn activates a store circuit 50 with control signals. The output of the register 42 is applied to the assembler 38. The output of the register 44 is applied to the assembler 10.

Address information in the subject system is comprised of a plurality of bytes or sub-units. When the address information is to be modified, the lowest order sub-unit will be modified in the ALU 25. An increment/decrement control circuit 51 receives the next highest order bytes of the current address from the MDB 16. The modified bytes are re-entered into the main data processing stream by the unit assembler 12. Depending on the output of an increment/decrement destination control circuit 52, the modified byte or bytes are stored in a corresponding byte storage position in the active storage circuit 17 or in an external register array 53.

Figures 2, 2O:
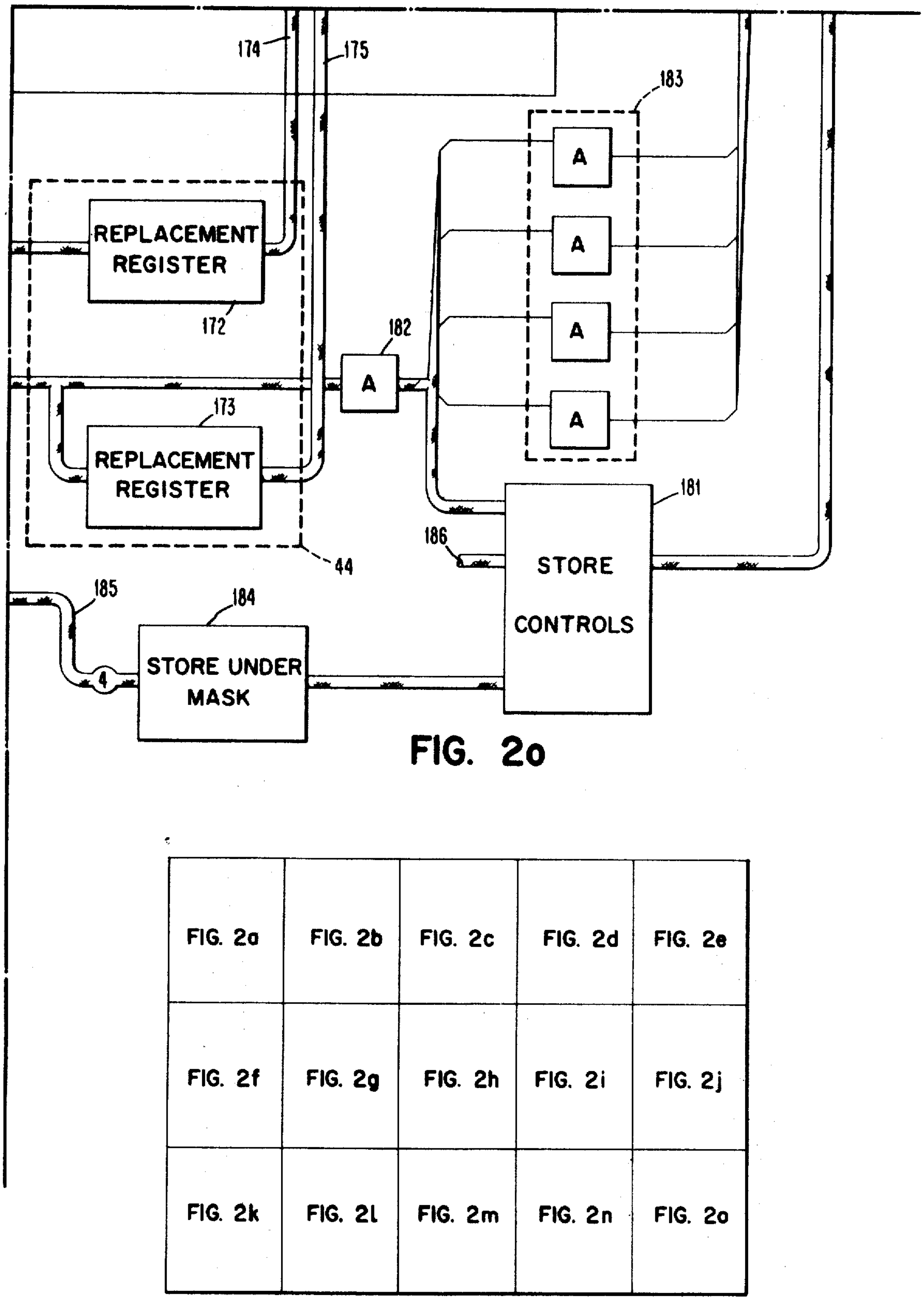
FIG. 2 shows the arrangement of FIGS. 2*a* through 2*o*.
FIGS. 2*a* through 2*o* are a more detailed block diagram of the invention.
Figure 2A:
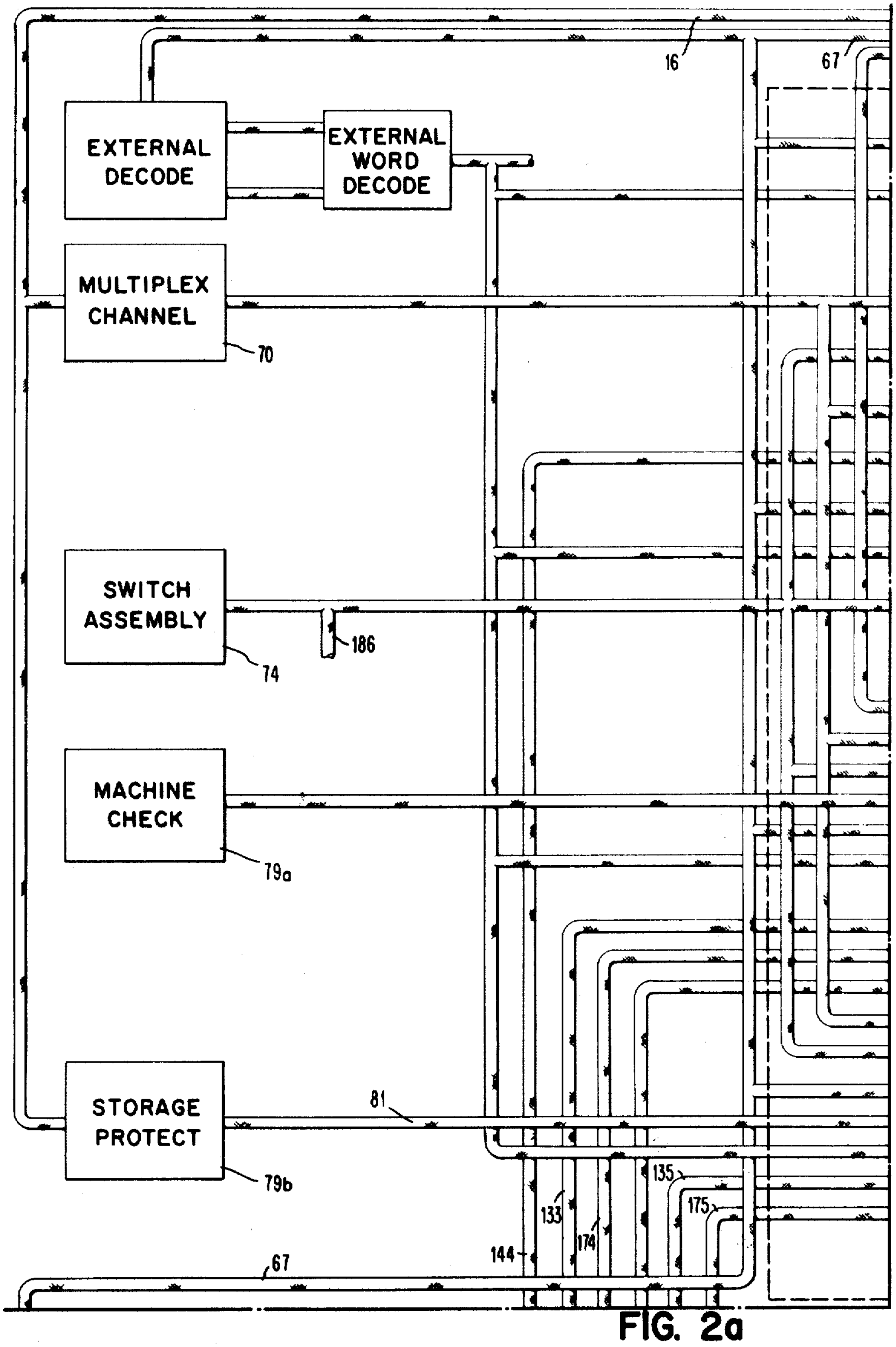

Referring to FIGS. 2*a* through 2*o*, there can be seen a more detailed block diagram of a data processing system which can advantageously employ the present invention. A main storage circuit 2 is of standard design, employing cores, transistor stages, or any other well-accepted storage medium as a mechanism for storing an individual bit in a storage word. The memory selected is one of the expandable type employing a plurality of basic operating modules, shown in FIGS. 2*e* and 2*j* (BOM) 54 through 57. Each of the modules 54 through 57 is comparably equipped and employs the following enumerated circuits as ancilliary circuits to the basic storage medium. A storage data bus in (SDBI) circuit 58 accepts the information from the main data bus 16. A store circuit 59 is an enabling circuit which indicates that the information available on the SDBI 58 associated with the BOM having the active store circuit 59 is to be stored at the location identified by the contents of the address circuit 46. In summary, the store circuit 59 provides a half select current to all locations in the selected BOM and the lines selected by the address in the address circuit 46 supply the remaining required half select current. The line selected thereby is energized to accept data from the SDBI 58. In a write-out situation, the word selected by the address circuit 46 interrogates a word location and reads it out into a storage data bus out (SDBO) circuit 61.

Each of the remaining basic operating modules is comparably equipped for storing or for reading out a unit of information, which unit comprises 16 data bits. As a matter of convenience, this unit is further divided into byte sizes comprising eight data bits. Therefore, a basic operating module contains a half word of information. A BOM select control circuit 62 is the means whereby pairs of the BOM's are selected. The details of the BOM select control are well known in the prior art. Briefly, this circuit operates to enable pairs of a plurality of output lines 63 through 66 in various combinations for reading out two half words into the storage data assembler 8. The output of the storage data assembler 8 is a storage data assembler bus out (SDABO) 67. This bus 67 comprises, as a matter of convenience for the present embodiment, a full unit of information or, more specifically, 32 data bits. This means that the SDABO 67 accepts in any combination an output from the various BOM's 54 through 57. Furthermore, the SDABO combines these half words in such a manner as to properly present, in parallel, a full unit of information or a full word to the external assembler 10.

Figure 2B:
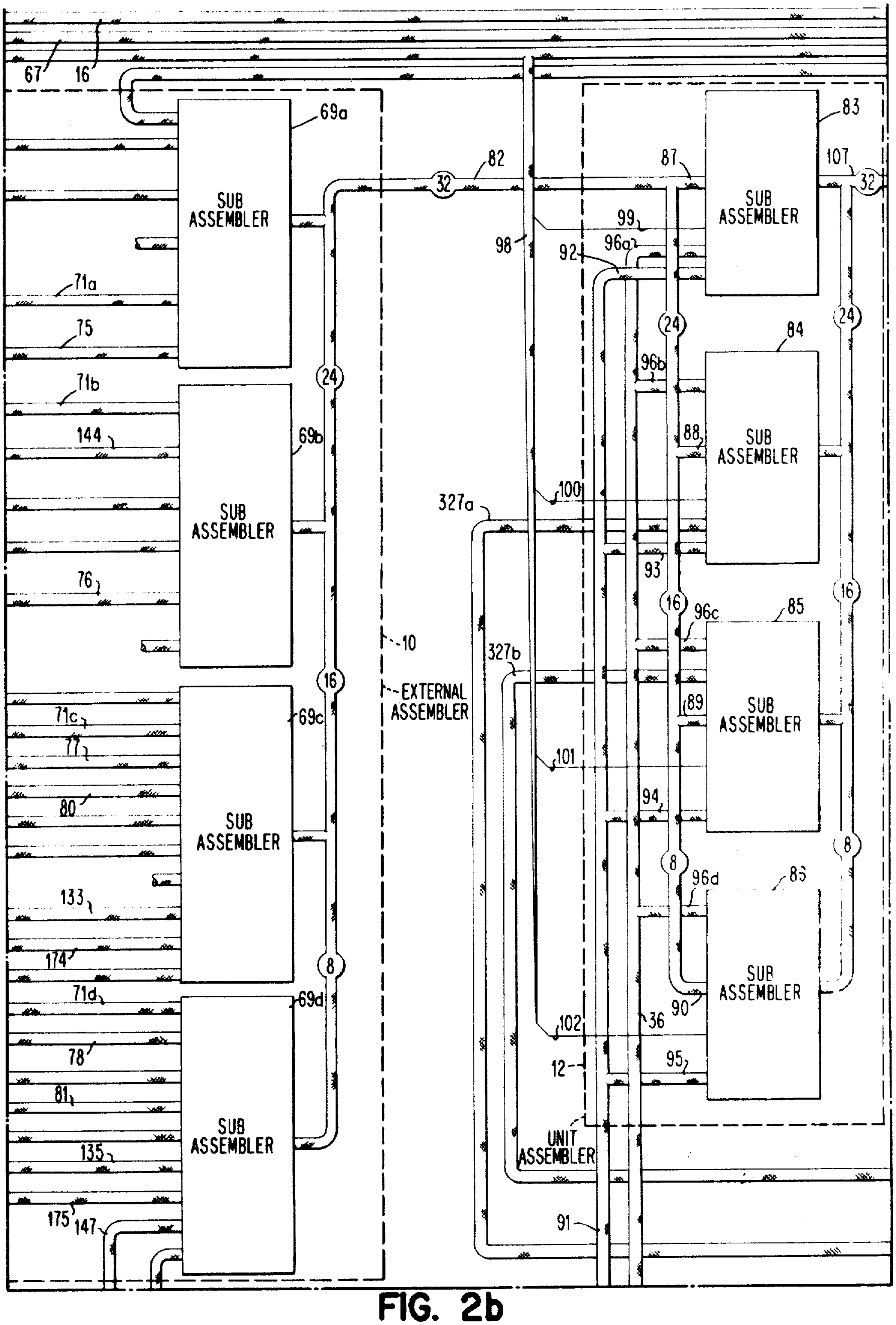
Figure 2C:
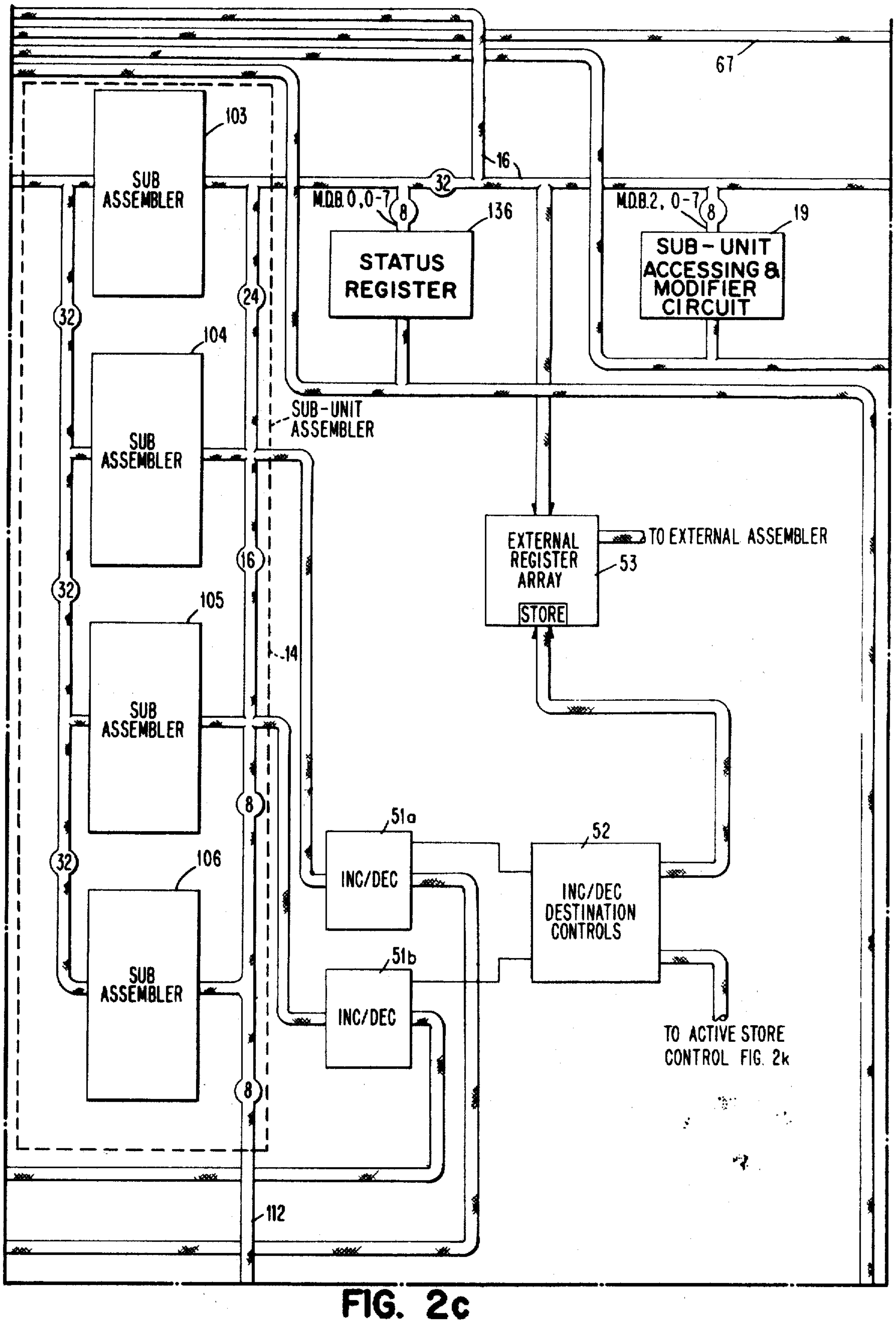
Figure 2D:
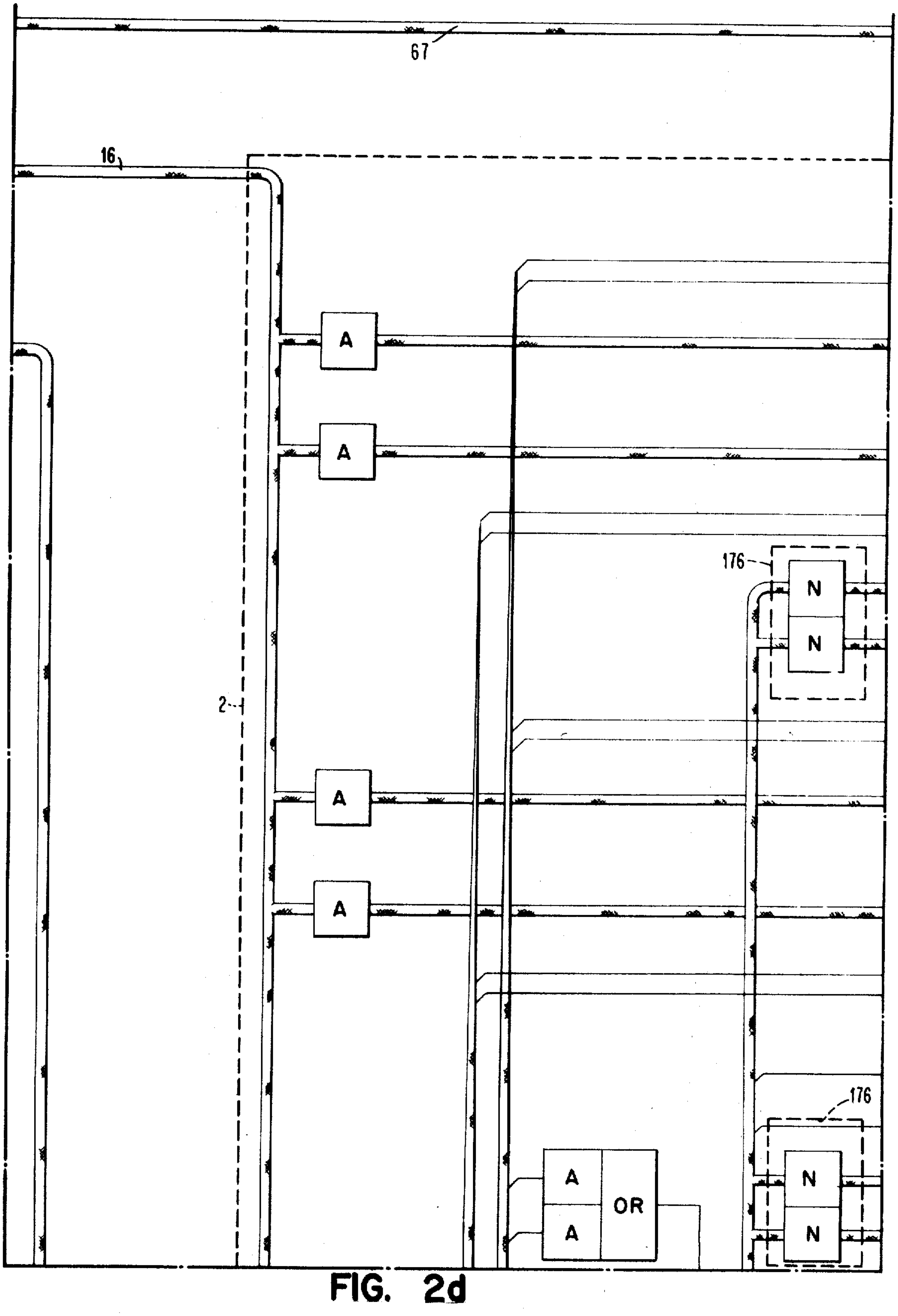
Figure 2E:
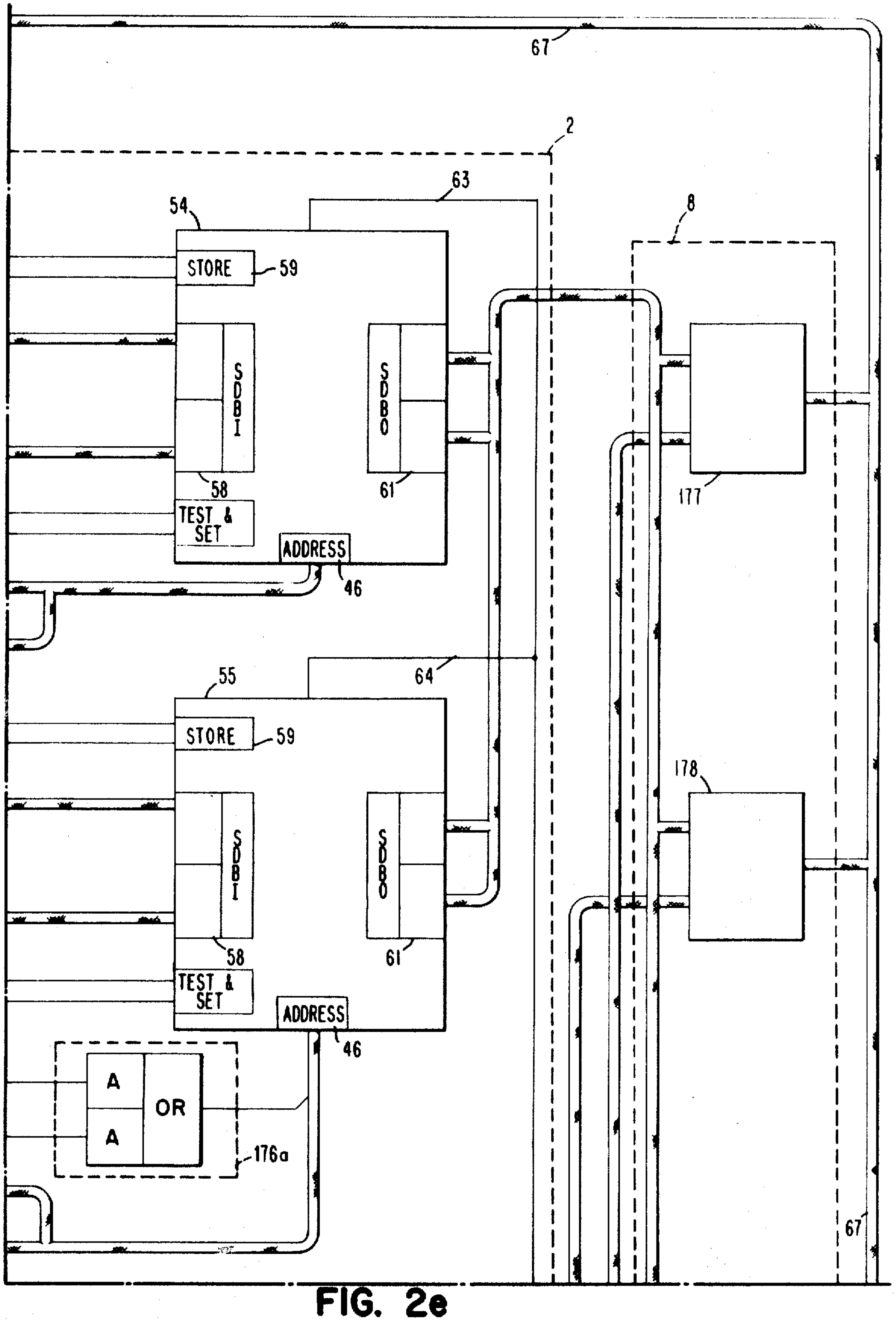
Figure 2F:
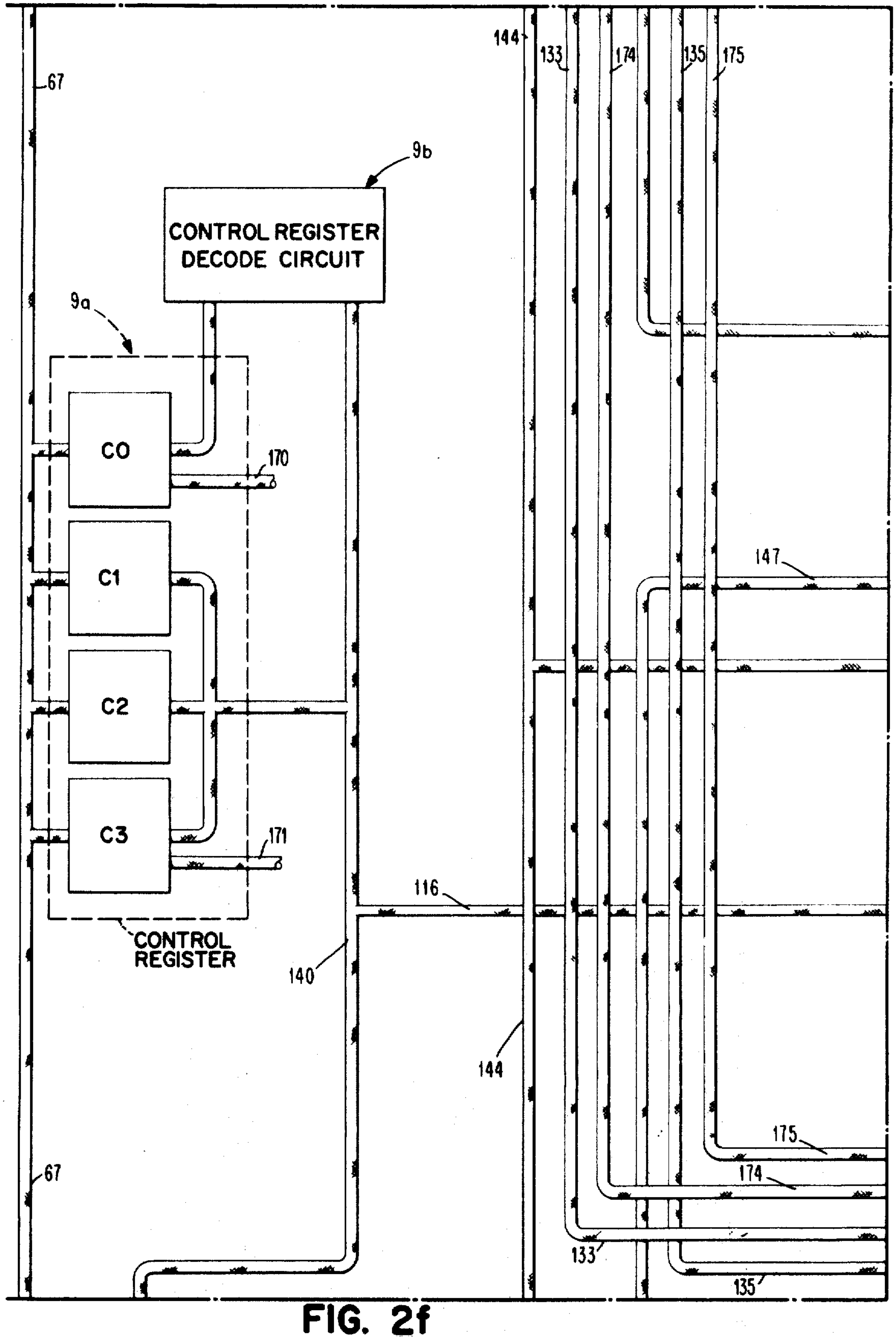
Figure 2G:
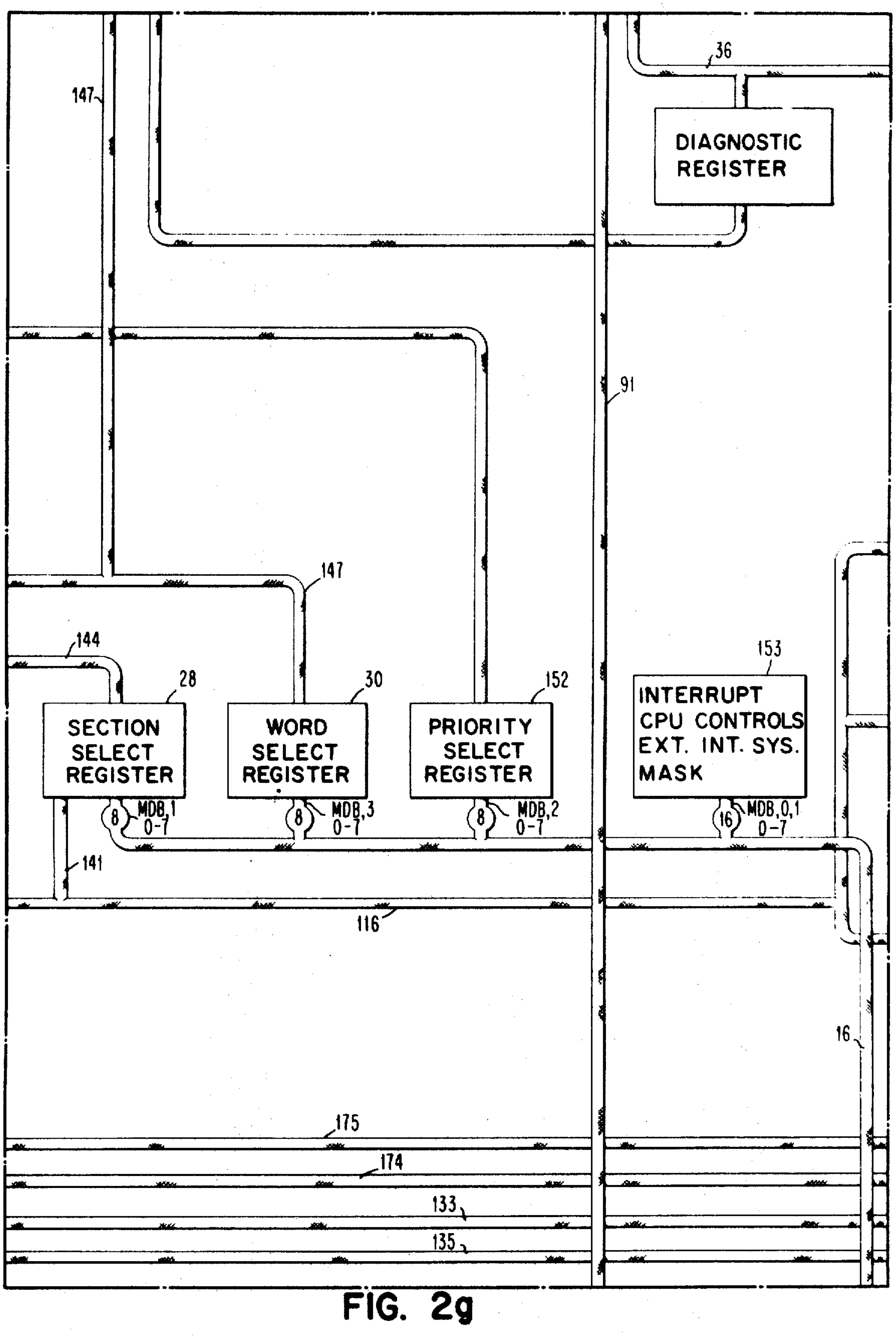

The external assembler 10, shown in FIG. 2*b*, has a separate sub-assembler 69*a* through 69*d* responsive to each sub-unit of information. As previously mentioned, the information carried by SDABO 67 is a word comprising four bytes; therefore, each sub-assembler 69*a* through 69*d* handles one byte. The external assembler accepts information from an additional plurality of sources. For example, information from a multiplex channel 70 is distributed among the sub-assemblers 69*a* through 69*d* by the buses 71*a* through 71*d* respectively. The multiplex channel also is 32 bits in width and the corresponding bytes are applied to the correspondingly numbered sub-assemblers in the external assembler 10. An additional input is from the various switches on the console panel shown as a switch assembly 74. The switches 74 are able to enter information, especially addresses, into the main memory by way of the external assembler 10. Each switch has the capability of entering one hexadecimal digit. Since the hexadecimal digit requires four binary bits of information for description thereof, each sub-assembler is capable of accepting two switch positions. The switches are identified as AB, CD, EF, GH and are applied to the sub-assemblies 69*a* through 69*d* by the buses 75 through 78 respectively. Additional sources of information for application to the external assembler originate in a machine check register 79. The machine check register only finds access to the external assembler 10 by the sub-assembler 69*c* over a bus 80. The storage protect register is applied to the sub-assembler 69*d* by a bus 81.

The output of the external assembler 10 is applied to the unit assembler 12 by a bus 82 capable of carrying a full unit of information or 32 bits separated into four byte channels. The unit assembler 12 comprises four sub-assemblers 83 through 86, each capable of handling a sub-unit of information or a byte. The respective channels of bus 82 are distributed among the sub-assemblies 83 through 86 by a plurality of buses 87 through 90 respectively. The unit assembler 12 receives a second series of input signals from the active storage circuit 17 over an active storage bus out 91. Corresponding bytes from the active storage bus out 91 are applied to the sub-assemblers 83 through 86 by a plurality of buses 92 through 95 respectively. In this manner, byte 0 from the ASBO 91 is applied to the sub-assembler 83 associated with byte 0 from the data bus 82. An additional input to the unit assembler 12 is applied thereto from the arithmetic logic unit 25 by the arithmetic bus 36. The bus 36 has the capacity of carrying in parallel the output from the ALU 25. In this embodiment, the bus carries eight data bits or one byte. This byte is applied selectively in parallel to the sub-assemblers 83 through 86 by a plurality of buses 96*a* through 96*d* respectively.

The sub-assemblers 83 through 86 are gated to the sub-unit assembler 14 by a series of enabling signals on an accessing bus 98. These enabling signals are applied to the various sub-assemblers 83 through 86 by an equal plurality of gating lines 99 through 102 respectively. These gating signals not only enable the output from the associated sub-assembler 83 through 86 respectively, but also open the input gate to respective sub-assemblers 103 through 106 in the sub-unit assembler 14. In this manner, the contents of the sub-assemblers 83 through 86 can be gated to a sub-assemblers 103 through 106 within the sub-unit assembler 14. The information from the unit assembler 12 is gated to the sub-unit assembler 14 over a bus 107. Again, the bus 107 is capable of carrying four bytes or four sub-units of information from the output of the unit assembler 12. This bus 107 is applied to each of the sub-assemblies 103 through 106 of the byte assembly 14. The output from the sub-unit assembler 14 is the main data bus 16 which bus is capable of carrying four bytes of information or a full unit of information.

Figure 2H:
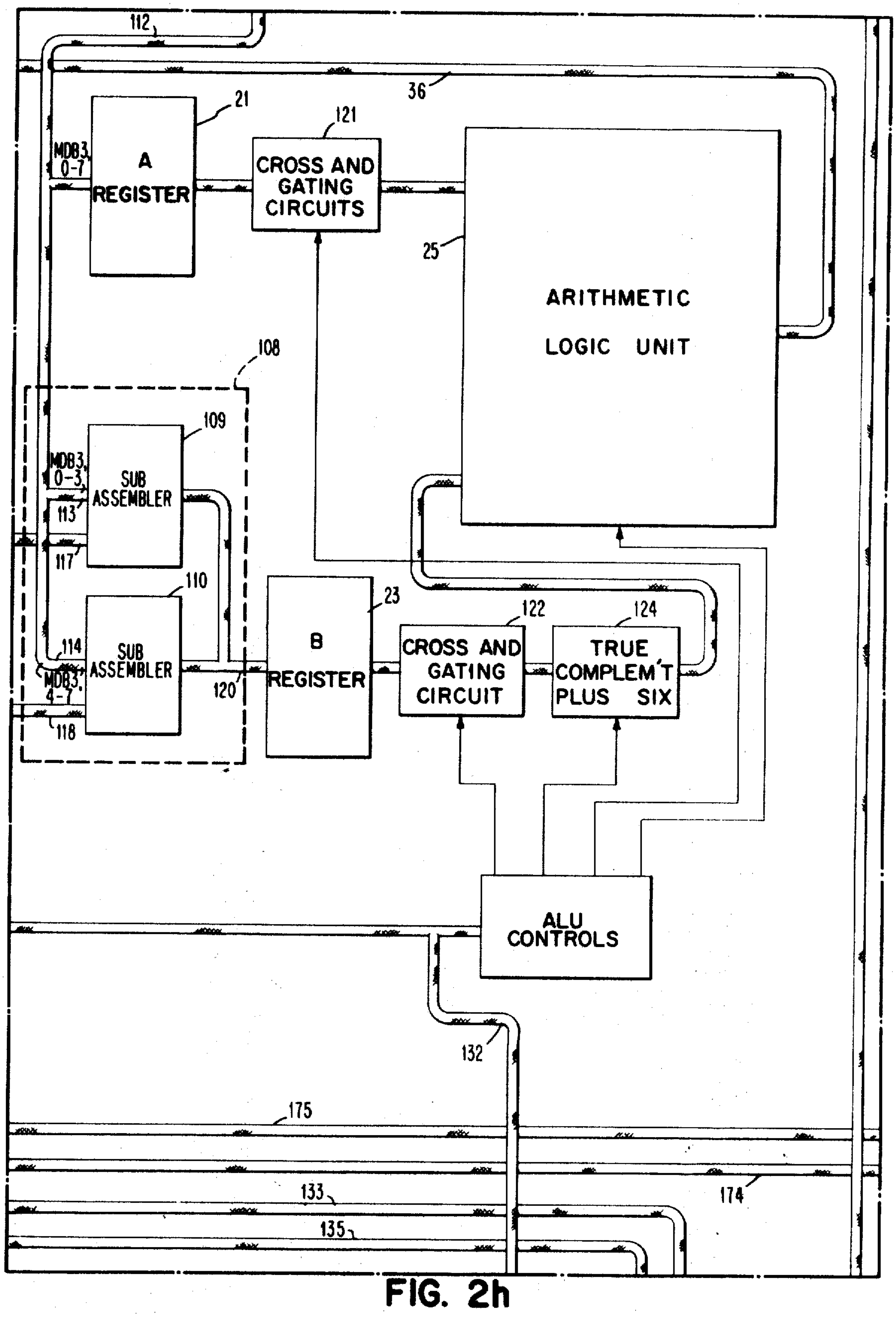
Figure 21:
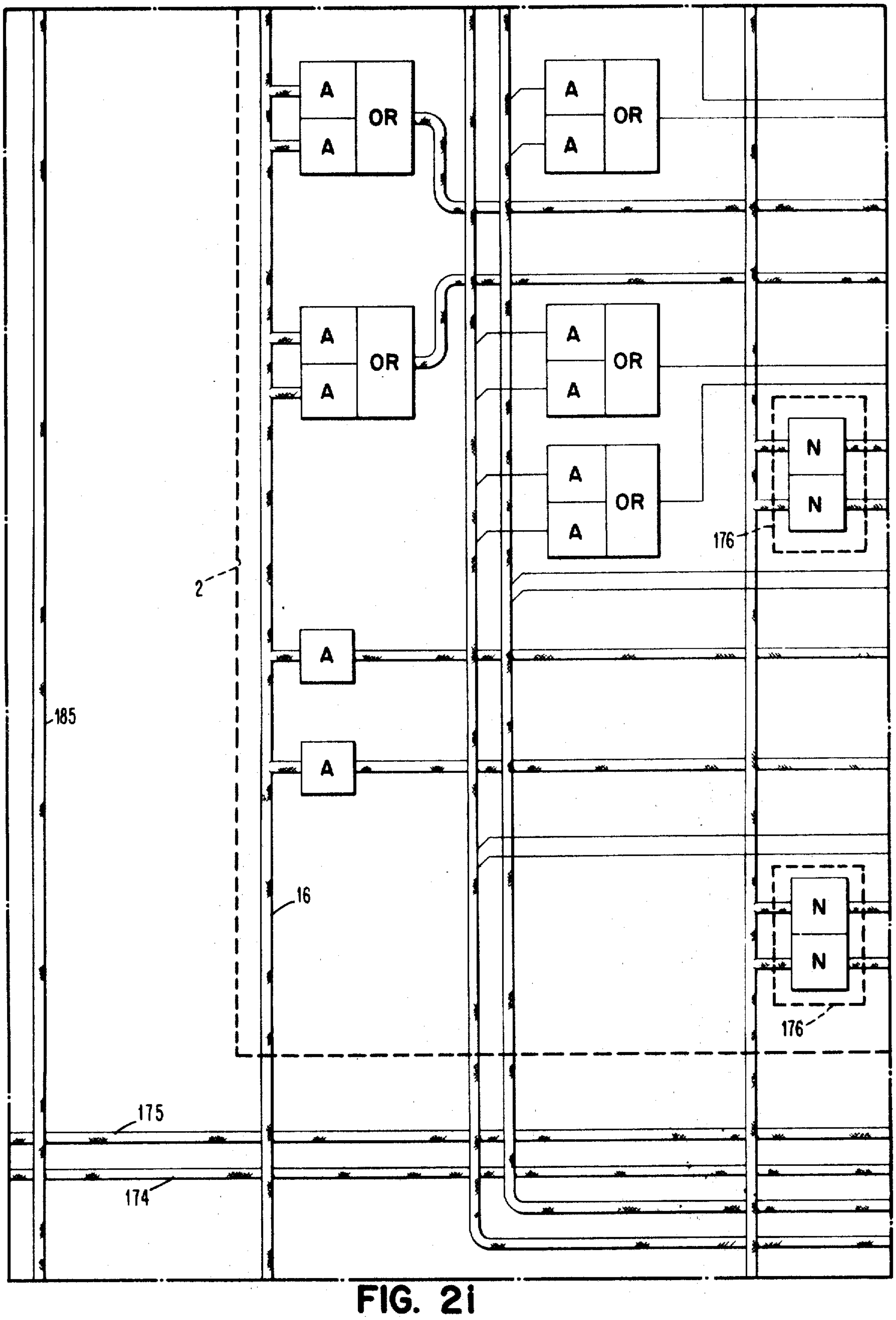
Figure 2J:
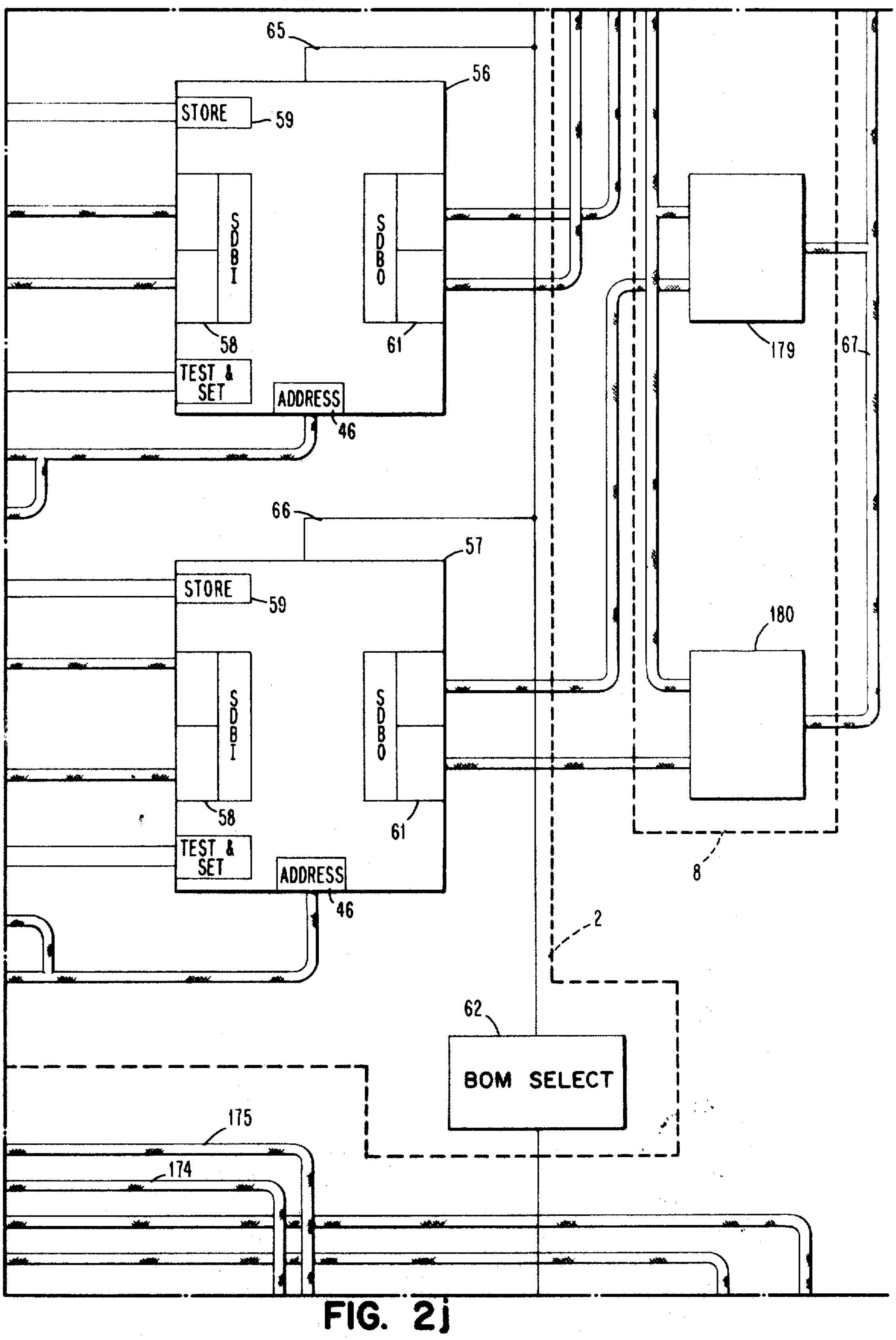

The output from the sub-unit assembler 14 is applied in parallel to the A register 21 and a B register assembler 108, shown in FIG. 2*h*. The B assembler 108 further comprises a plurality of sub-assemblers 109 and 110. The output from the sub-assembly 106 can be selectively applied to either of the sub-assemblers 109 or 110 over a bus 112 comprising additionally a plurality of buses, 113 and 114, applied to the respective sub-assemblers 109 and 110. The sub-assemblers 109 and 110 have a further series of input signals applied thereto over a control register bus 116. The bus 116 is three bytes or 24 bits in width and is applied selectively to either of the sub-assemblers 109 or 110 by an additional pair of buses 117 and 118 respectively. The output of the B assembler 108 is applied to the B register 23 by a B assembler output bus 120. The A register 21 and B register 23 inputs to the ALU 25 are applied thereto by well-known cross and partial gating circuits 121 and 122 respectively. The gating circuit 121 is capable of crossing the high four bits with the low four bits or gating only the high or the low to the ALU 25. The gating circuit 122 is capable of shifting only the high or the low four bits of the B register 23 to the ALU 25. A true complement and plus six circuit 124 is located intermediate the circuits 122 and 25. The details of any of these circuits are not necessary for the understanding of the present invention.

The mechanism for generating an address in main memory 2 is the memory address register 40 and the memory address assembler 38. The link address register 42 provides a mechanism for saving the last previous contents of the register 40 in response to a branching situation. The register 40 comprises a further plurality of registers 125 through 127 and each register has the capacity for storing one byte of address information, and the bytes are called the M1, M2, and M3 bytes respectively. The register 42 comprises a pair of individual byte registers 128 and 129. The memory address assembler 38 comprises two sub-assemblers 130 and 131. Like all other assemblers, the assembler 38 receives information from a plurality of input sources and also control signals from the control register **9*a* over a bus 132 and the bus 116. The register 9*a* comprises a unit of information consisting of four bytes of control data. The control register decode circuit 9*b* operates to decode the various inputs from the register 9*a*. The output of the decode circuit 9*b*** is distributed throughout the remaining part of the circuitry to enable the AND gate circuits and therefore to gate information from and into the remaining circuits of the machine.

The remaining inputs to the sub-assembler 130 comprise the output of the register 128 as applied by a bus 133, and the output of the unit sub-assembler 85 as applied thereto through the sub-assembler 105 and by the bus 16 and a further bus 134. The contents of the bus 133 are applied also to sub-assembler **69*c*. The remaining inputs to the sub-assembler 131 comprise the output of the register 129 as applied by a bus 135, the output of a status register 136 as applied by a bus 137, and the output of the sub-assembler 86 as applied thereto through the sub-assembler 106 and by the bus 16 and a further bus 138. The contents of the bus 135 are applied also as an input to the sub-assembler 69*d***.

The memory address assembler 38 selectively gates data bits from the main data bus 16, from the link register 42, from the current control word, or the status register 136 into the register 40.

Figure 2K:
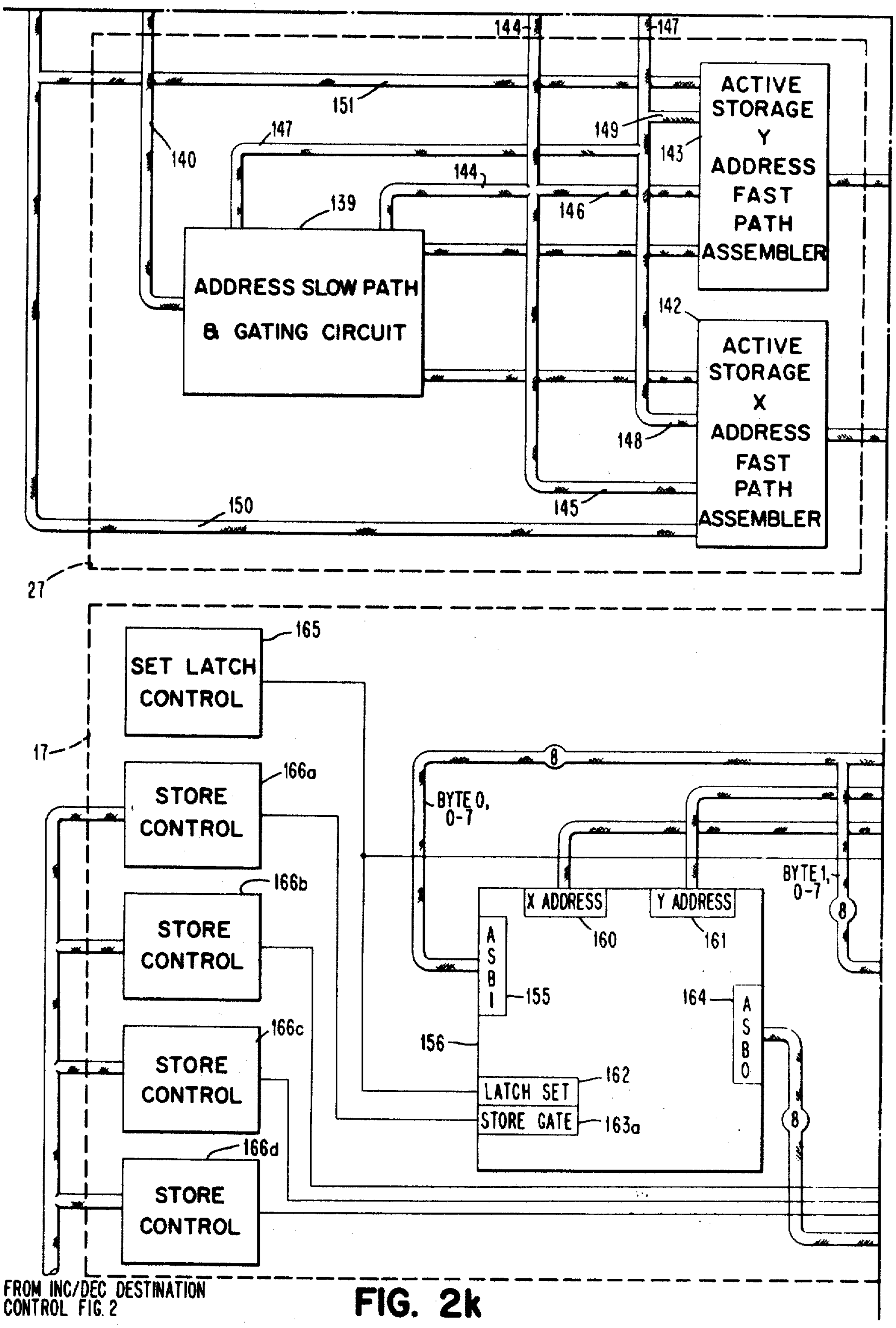

The output of the register **9*a* is applied to an address slow path and gating circuit 139 within the active storage address assembler 27**, shown in FIG. 2*k*, and the section select register 28 by the bus 116 and a plurality of lines 140 and 141 respectively. The output of the circuit 139 is applied to an active storage X address assembler fast path circuit 142 and to an active storage Y address assembler fast path circuit 143. The circuit 142 generates the X axis address line and the circuit 143 generates the Y axis addressing lines. Together they select a single word from the active storage memory 17. The register 28 furnishes information to the circuits 142 and 143 over a bus 144 and a plurality of branch buses 145 and 146 respectively. The bus 144 is also connected as an input to the sub-assembler **69*b* in the external assembler 10. An additional input to the circuits 142 and 143 is applied thereto from the word select register 30 over a bus 147 and a plurality of branch buses 148 and 149. Additionally, the bus 147 is employed as an input to the sub-assembler 69*d* in the external assembler circuit 10. The final inputs to the circuits 142 and 143 originate from the storage data assembler 8 and applied therefrom over the storage data assembler bus out 67 and a plurality of branch buses 150 and 151**.

The main data bus 16 acts as input bus for a plurality of additional circuits. The sub-unit accessing and modifier circuit 19 is responsive to the main data bus byte 2, bits 0–7. The status register 136 is responsive to the main data bus byte 0, bits 0–7. The word select register 30 receives input information from the main data bus 16, byte 3, bits 0–7. The section select register 28 is responsive to the main data bus byte 1, bits 0–7. A priority select register 152 is responsive to the main data bus 16, byte 2, bits 0–7. An interrupt and control register 153 is responsive to the main data bus 16, bytes 0 and 1. Other circuits responsive to the main data bus 16 are a branch control circuit 154 and the active storage bus in (ASBI) circuit 155.

The active storage circuit 17 comprises a second plurality of basic operating modules 156 through 159. The basic operating modules 156 through 159 need not have the same capacity as the previously mentioned modules 54 through 57. Their resemblance resides in the fact that a larger memory system comprises a plurality of smaller similarly constructed basic operating modules.

Each basic operating module includes in addition to the ASBI 155, an X address circuit 160, a Y address circuit 161, a latch set circuit 162, store gates **163*a* through 163*d*, and an active storage bus out (ASBO) circuit 164. The information to be stored in a basic operating module is applied to the ASBI 155 and it is stored at the addressable location designated by the contents of the circuits 160 and 161. The X address and Y address circuits together select a single storage location into which the contents of the ASBI 155 is to be stored. In those situations when the information is to be interrogated from the basic operating module 156, the contents of the X address and Y address select the location and the contents are read out into the ASBO circuit 164. The latch set circuit 162 operates to enable the write out procedure while the store gates 163*a* through 163*d*** operate to enable the storage procedure.

Each of the basic operating modules 156 through 159 stores a unit of information. This unit of information need not be the same length as the unit of information held in the basic operating memory 54 through 57. The unit of information stored in a basic operating module, such as 156, is eight binary bits or one byte. The address information stored in the circuits 160 and 161 of each basic operating module 156 through 159 is applied to these circuits in parallel from the circuits 142 and 143. This means that one byte of information is addressed in each module simultaneously. One byte of information from each basic operating module is transferred from the ASBI 155 associated with each basic operation module or transferred onto the ASBO 164 and the bus 91.

In reviewing then, when a single address is furnished from the circuits 142 and 143, a full word of information, four bytes, are read out from the respective modules 156 through 159 and placed onto their respective locations in the active storage bus 91. This full word of information is applied to the sub-assemblers 83 through 86 over the plurality branch buses 92 through 95. Corresponding bytes from the BOM's 156 through 159 are applied to sub-assemblers 83 through 86 respectively. The latch set circuits 162 are enabled from a set latch control circuit 165. The store gate circuits 163*a* through 163*d* are enabled from a plurality of store gate control circuits 166*a* through 166*d*, respectively, one of which circuits is associated with each BOM 156 through 159.

Figure 2L:
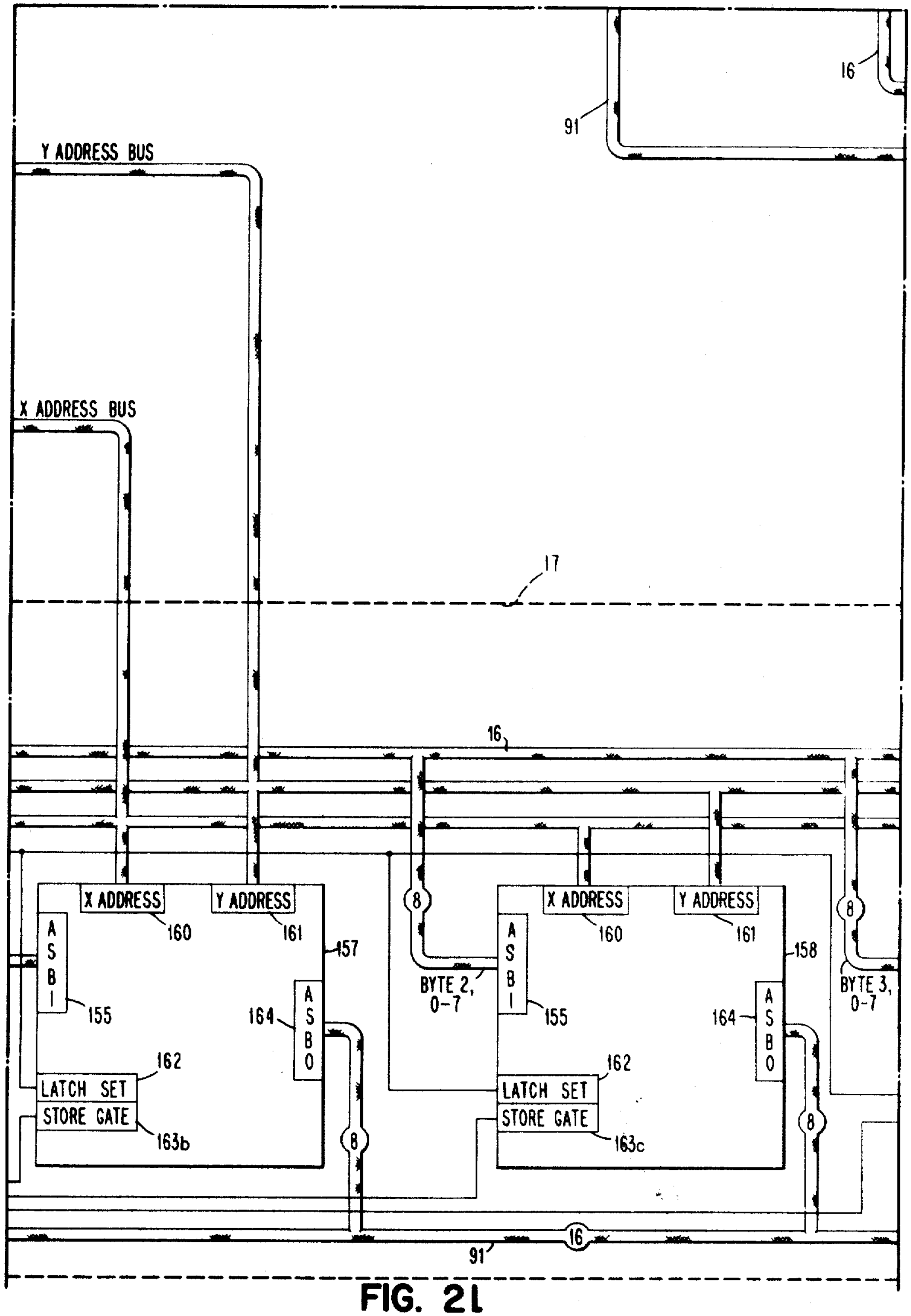
Figure 2M:
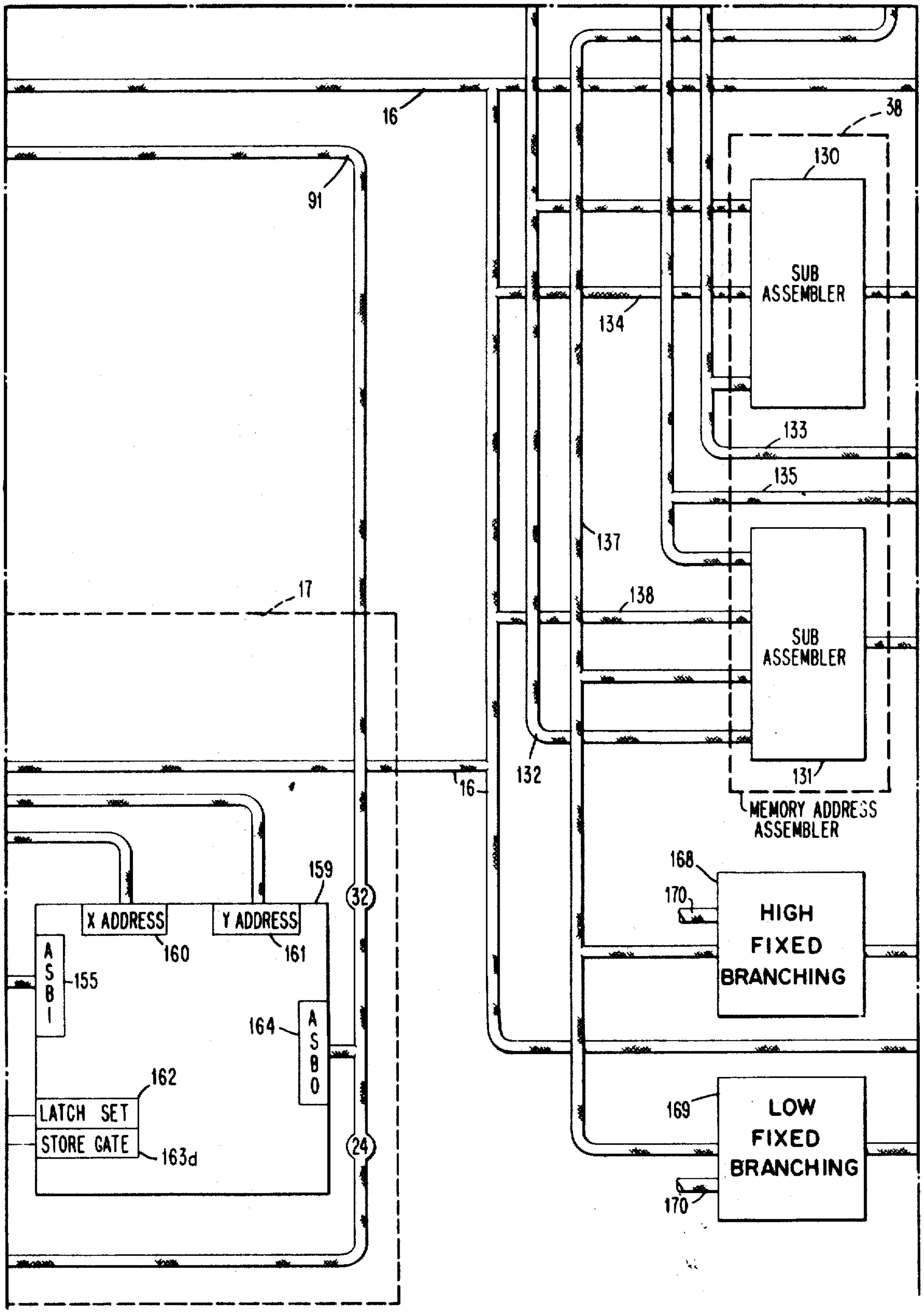
Figure 2N:
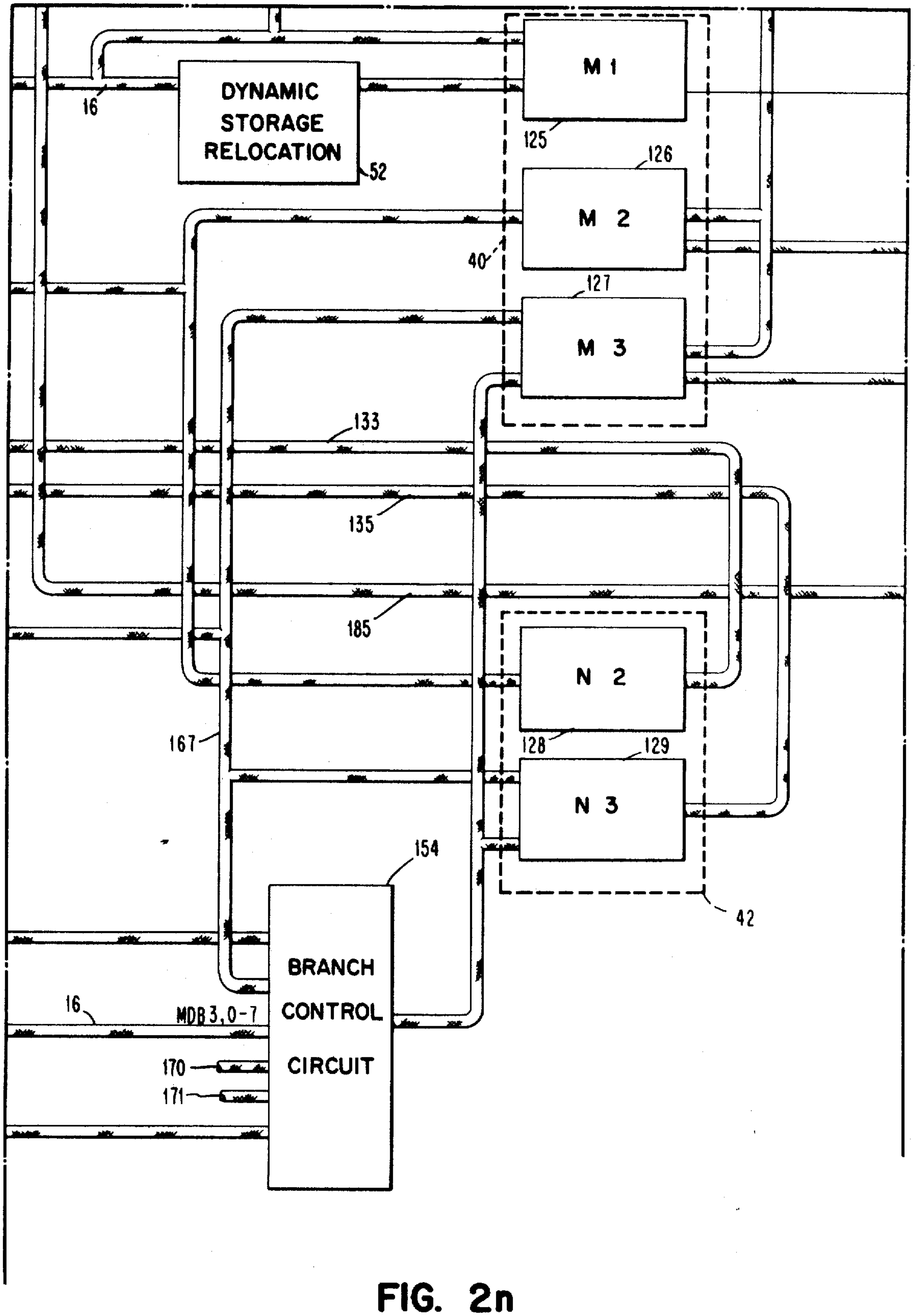

The branch control circuit 154, shown in FIG. 2*n*, is equipped with a plurality of input signals. One previously mentioned set of signals is from the main data bus 16, byte 3 position. The output from the sub-assembly 131 is applied to the branch control circuit 154 over a bus 167. A high branch circuit 168 and a low branch circuit 169 also furnish input signals to the branch control circuit 154. Output signals from the decode circuit 9*a* are applied to the branch control circuit 154 over a plurality of buses 170 and 171.

The register 40 comprises three sub-unit registers 125 through 127 as previously mentioned. Each register holds eight binary bits of address information, but only the registers 126 and 127 are employed for selecting a single storage location within the basic operating modules 54 through 57. The bit positions in the register 125 are available for expansion of the present capacity exhibited by the basic operating modules 54 through 57. When additional storage is placed into the system, the operation of the register 125 will follow the general format as set down for the remaining registers. The outputs from the registers 126 and 127 are applied to a pair of replacement registers 172 and 173 respectively. During certain branching operations, it is necessary to have a parallel back up system as furnished by the pairs of registers 128 and 129 and 172 and 173. The output from the registers 172 and 173 is applied to the sub-assemblers 69*c* and 69*d* respectively in the external assembler 10 by a pair of branch buses 174 and 175 respectively.

The outputs from the registers 126 and 127 are applied in parallel to the address circuit 46 of each of the basic operating modules 54 through 57 by an additional inverter circuit 176. Associated with the basic operating module 55 and the address circuit 46 associated therewith, the bit position 0 of the register 126 is responsive to a special assembler 176*a*. The storage data assembler 8 comprises a plurality of sub-unit registers 177 through 180. The storage capacity of each of these last mentioned registers is one byte and each register is responsive to selected bytes of information from each of the basic operating modules 54 and 55. Each access to the memory 2 brings out four bytes of information, two bytes from each of the modules 54 and 55. The basic operating modules 56 and 57 are shown connected to the registers 177 through 180 in one additional manner when it is desired to expand the storage capacity of the memory system 2.

The output from the register 127 is applied to a storage control circuit 181 by an AND gate 182. The output from the AND gate 182 is a plurality of enabling signals connected to a test and set circuit 183. Enabling signals from the circuit 183 can be used singly or in combination to effect the well-known test and set operation on the BOM's 54 through 57. A remaining input to the storage control circuit 181 originates from a store under mask circuit 184 which is connected to the register 19 by a bus 185. A further input to the circuit 181 is from the switch assembly circuit, shown in FIG. 2*a*, over a bus 186.

Referring again to FIG. 1, the operation of the various circuits is herein now described when practicing the claimed invention. The arithmetic logic unit 25 is the mechanism for modifying the current address by any constant retrieved from the control word memory 4. The constant value K is read from a current control word by gates energized by the decoding of certain fields of an accessed micro-program control word. The current address is a plurality of sub-units or bytes. The present invention is equipped with tandomly placed four unit transfer mechanisms 10, 12, and 14 in FIGS. 2*b* and 2*c*. The transfer mechanisms 10, 12, and 14 are a three-stage mechanism due to its use as a sub-unit or partial unit selection mechanism completely described in a patent application entitled "Data Handling Apparatus Employing an Active Storage Device With Plural Selective Read and Write Paths" in the name of K. A. Bell et al., Ser. No. 670,919, filed Sept. 27, 1967, and assigned to the assignee of the present invention. However, for the purpose of the present invention, the switching mechanism could be represented by a single switching stage such as 12. Each byte from 0 through 3 is separately handled as hereinafter described. The output from the stage 14 is the main data bus 16, bytes 0 through 3. Bytes 0 through 3 are simultaneously obtained by gating out the contents of sub-assemblers 103–106 shown in FIG. 2*c* The low order portion of the address on the main data bus byte 3 contains that portion of the address to be incremented or decremented by the constant value K retrieved from the control word memory 4. The low order or byte 3 is applied to the A register 21. The constant value is applied to the B register 23. The content of the A register 21 and the B register 23 are arithmetically combined in either an incrementing or decrementing manner in the arithmetic logic unit 25. Simultaneously, the next significant byte or bytes of the current address on the MDB 16 is applied to the incrementer/decrementer circuit 51. The contents of the main data bus byte 2 are applied to an incrementer/decrementer 51*b* and the contents of the main data bus byte 1 are applied to an incrementer/decrementer unit 51*a*. The operation of the incrementer/decrementer 51*a* and 51*b* is to modify the associated bytes 1 and 2 respectively by 1 to reflect a possible carry or no-carry from the modification of the lowest order byte 3 being modified in the ALU 25. Both I/D operate simultaneously. The output of the incrementer/decrementer 51*a* and 51*b* is automatically transferred back to the sub-assemblers 84 and 85 respectively of the unit assembler 12 at the same time as the output from the ALU 25 is transferred to a low order input to the unit assembler 12 (see FIG. 2*b*). Depending upon the output from the carry controls of the ALU 25, to be more fully described subsequently, MDB byte 2 is selected for transfer to an identified destination register. Similarly, MDB byte 1 is selected for transfer to an identified destination register depending on the detect 00FF operation of the circuit 52. Depending on the coding of a microprogram control word in the control register 9*a* of FIG. 1, the destination of the modified address bytes will be either the active storage 17 or the external register array 53 shown in FIG. 1. In review, it should be indicated that the destination register contains the non-updated address. Accordingly, if a particular change is not made then the unaltered address with the mere addition of the new contents of the selected main data bus byte or byte 3 then contain the next sequential data address. This is accomplished by depending upon the carry out of the ALU 25 and the result of the incrementer/decrementer control circuit 52 to control the transfer from the output of the I/D's 51*a* and 51*b*. The incrementer/decrementer destination control circuit 52 is responsive to the output of the detect signals from the incrementer/decrementers 51*a* and 51*b* and the output of the ALU in the form of the carry signal for generation of gating signals to the sub-unit assemblies 103 through 106, shown in FIG. 2*c*.

Figure 3D:
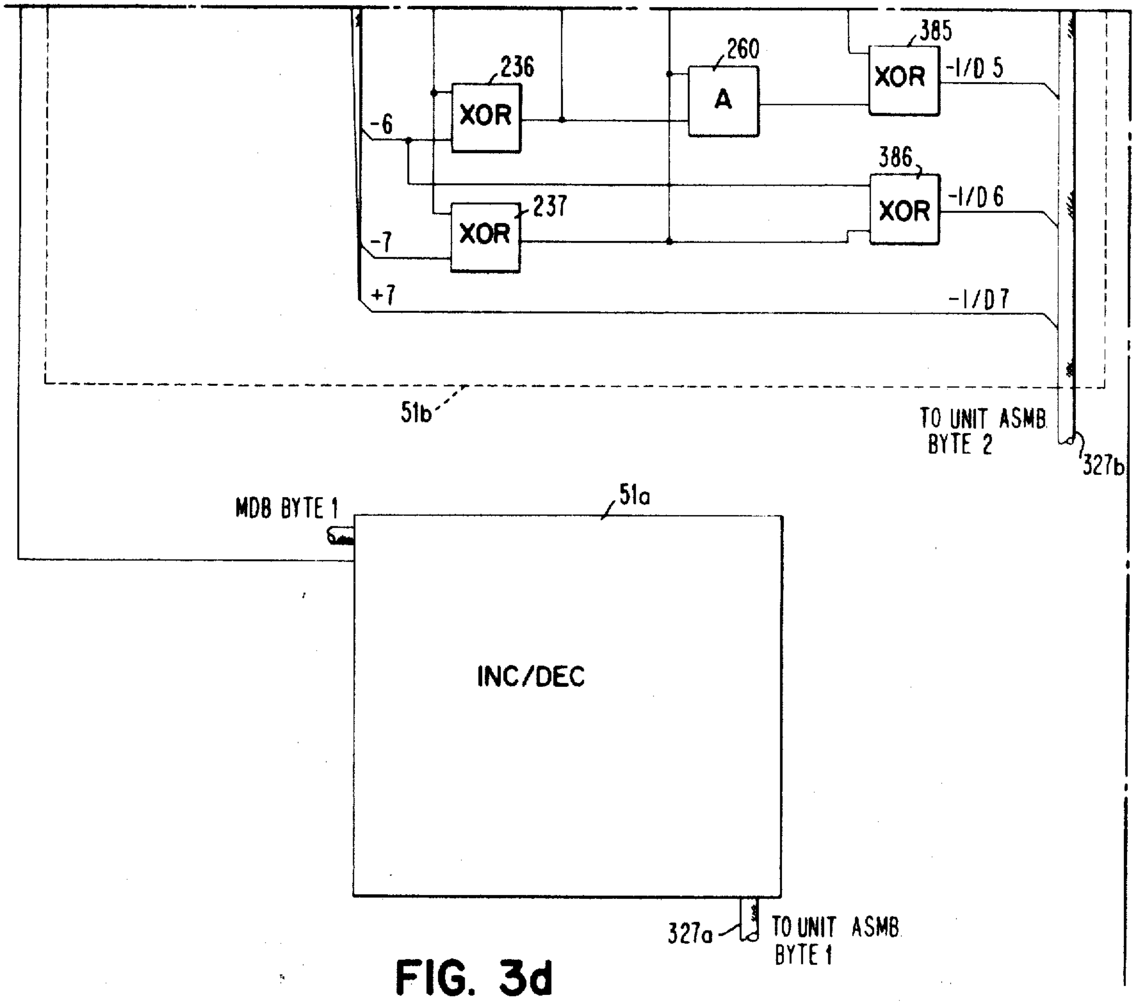
FIGS. 3*a* through 3*f* are a more detailed diagram of the invention.
Figure 3:
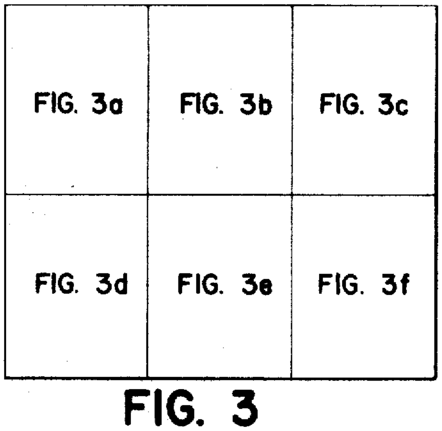
FIG. 3 shows the arrangement of FIGS. 3*a* through 3*f*.
Figure 3A:
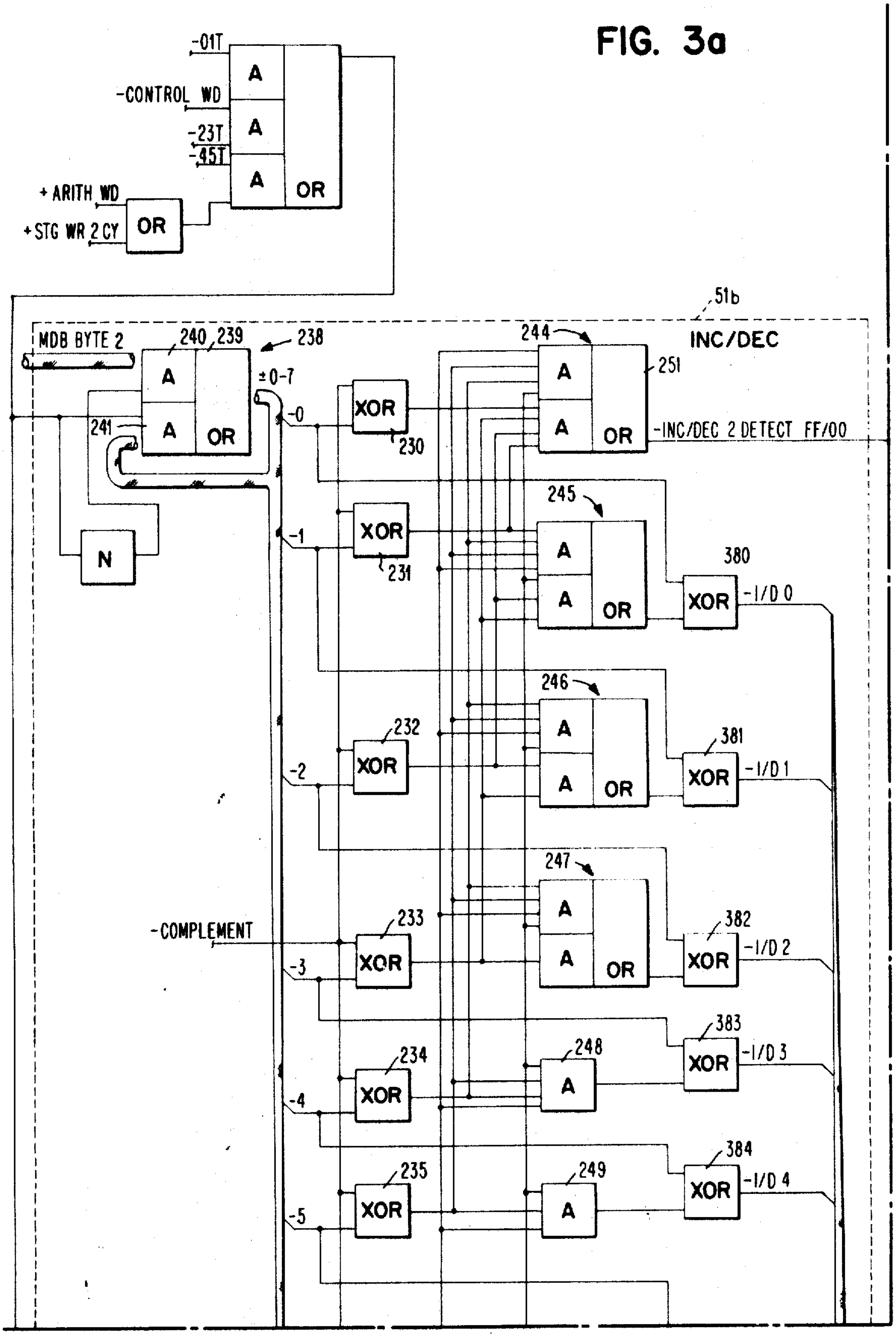
Figure 3B:
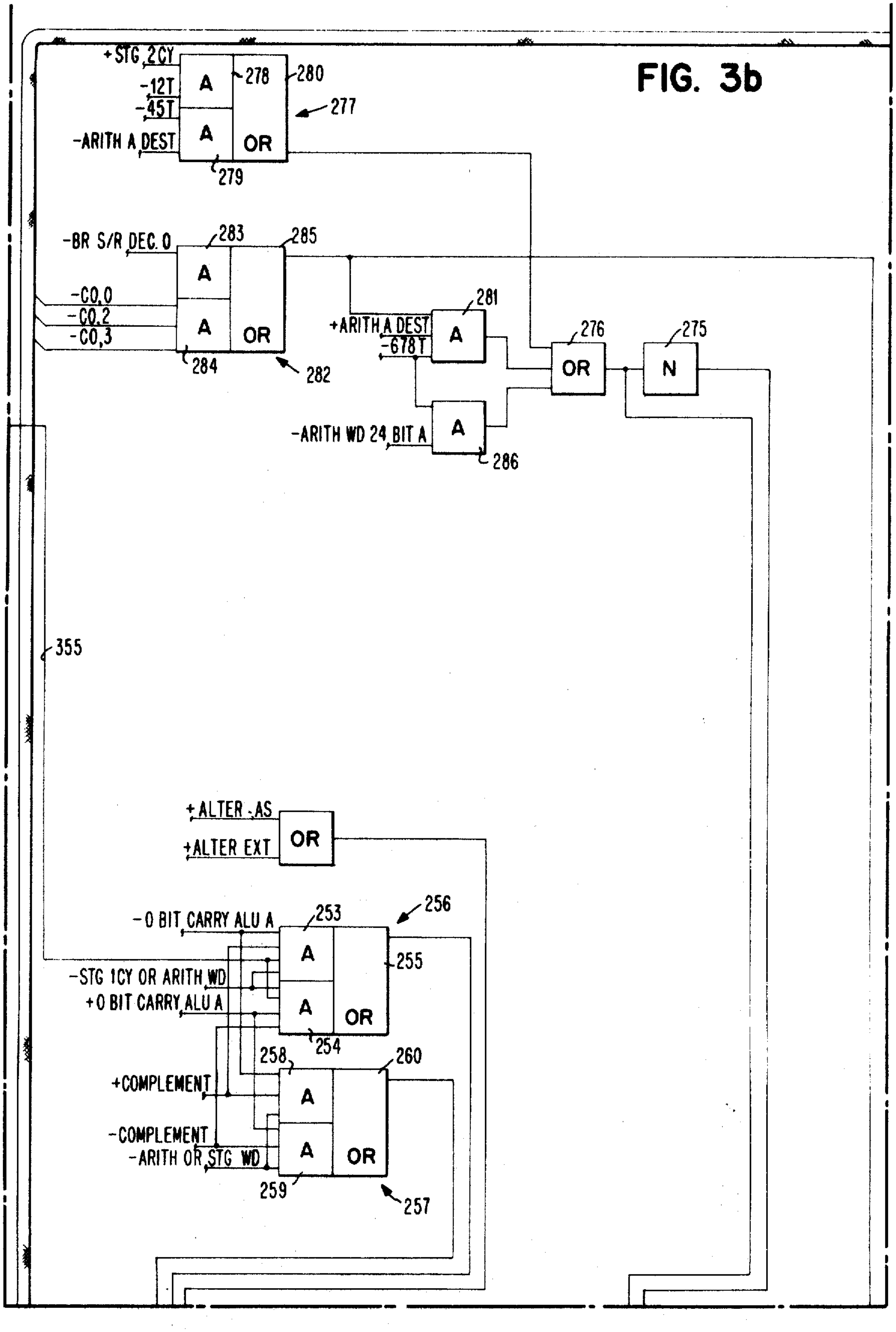
Figure 3C:
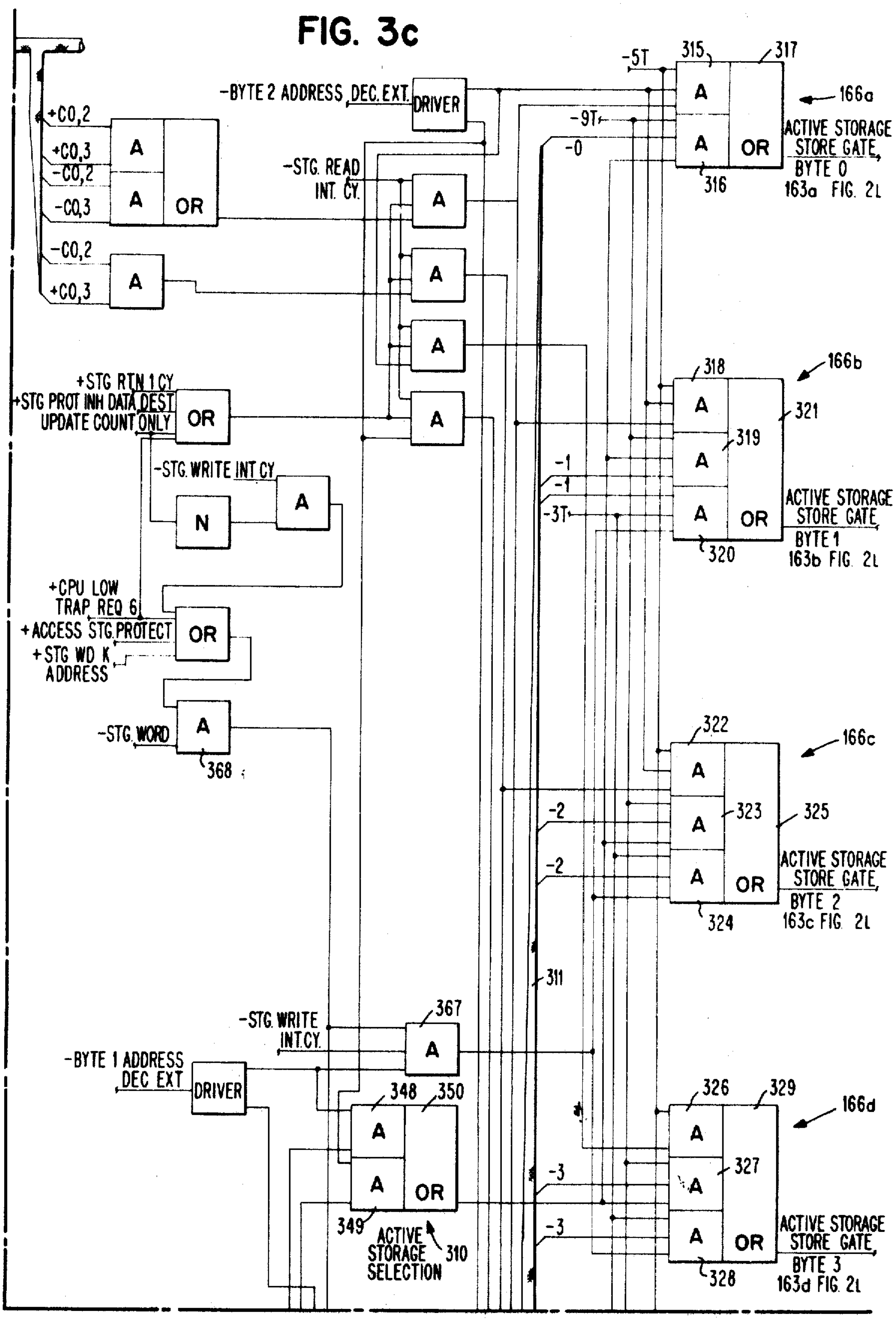
Figure 3E:
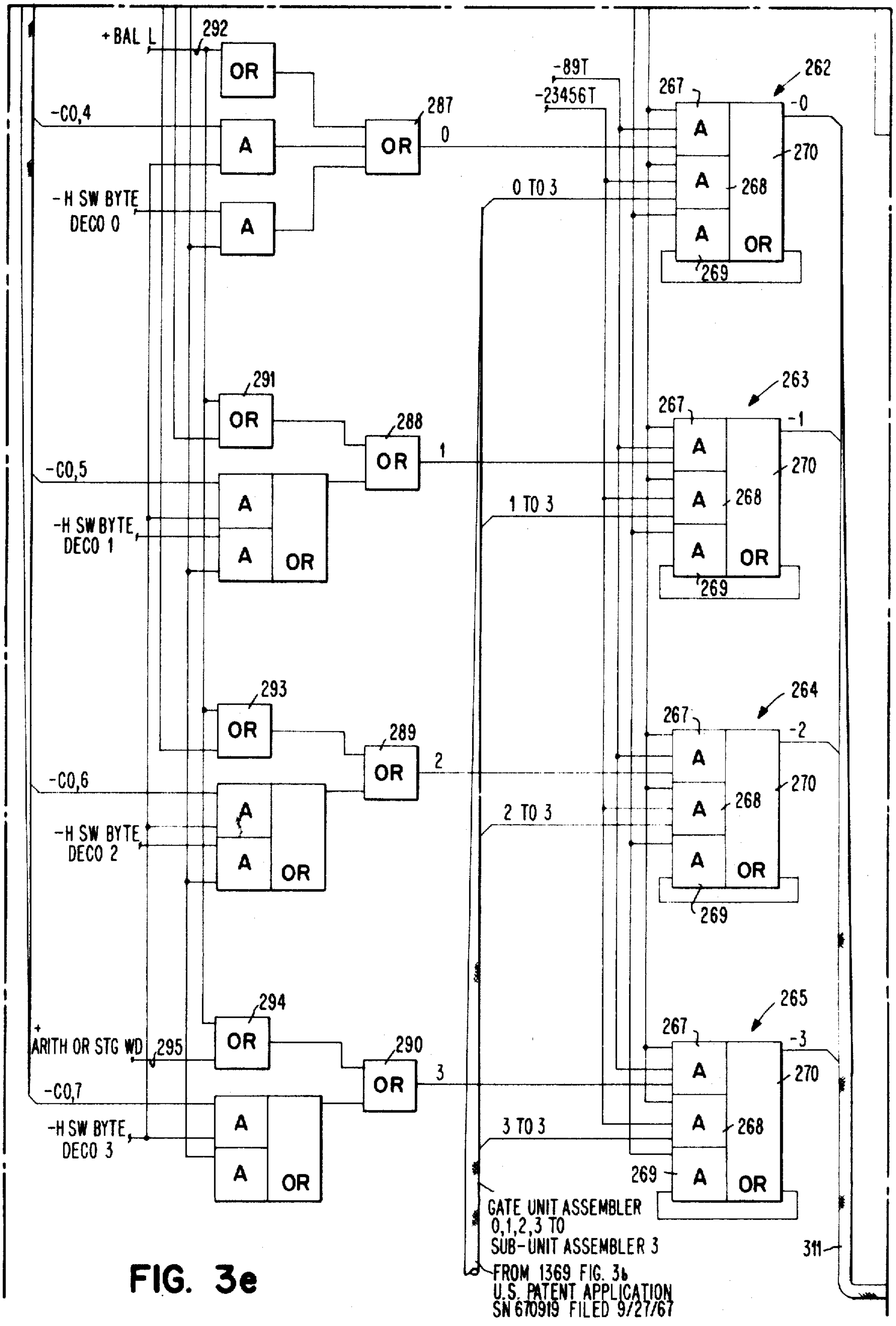

Referring to FIG. 3, there can be seen a layout of FIGS. 3*a* through 3*f*. FIGS. 3*a* and 3*b* show the details of the incrementer/decrementer 51*b*. Since the incrementer/decrementer 51*b* is identical to the incrementer/decrementer 51*a*, only one I/D circuit is shown in detail. The I/D circuit 51*b* comprises a plurality of exclusive OR (EOR) input stages 230 through 237. There are as many input EOR gates 230 through 237 as there are individual bit positions in a sub-unit of information. The present embodiment of this invention employs an eight bit sub-unit of information called a byte. An input gate circuit 238 comprises as many OR circuits 239 and input AND gates 240 as there are individual bits in a sub-unit of information. A companion AND gate 241 is associated with each AND/OR combinations 240 and 239 respectively. However, for purposes of simplicity, only one representative unit has been shown. Each AND gate 240 is set from its corresponding bit on MDB 16. The gating signal for the EOR circuits 230 through 237 originates from a negative complement signal originating from the ALU circuit 25.

The negative complement signal is the signal which controls whether an increment or a decrement is performed. If the negative complement signal is in the negative state, this indicates that a complement addition (subtraction) is being performed by the ALU 25 and that a decrement function should be performed by incrementer/decrementers 51*a* and 51*b*. Likewise, if the negative complement signal is in the positive state, this indicates that a true addition is being performed by the ALU 25 and that an increment function should be performed by incrementer/decrementers 51*a* and 51*b*.

A plurality of AND/OR circuits 244 through 247 and an additional plurality of AND gates 248 through 250 operate to decode various outputs from the EOR gates 230 through 237 in order to save time in carry propagation so that the result of the incrementation or decrementation can be had in the minimum amount of time. The result of the operation is available from the output of EOR circuits 380 through 386 on bus 327. Bus 327 serves as an input to the unit assembler 12 as shown in FIG. 1.

The circuit 244 has a second function. This function is to decode a sub-unit of information which comprises all binary zeros or all binary ones. The output of an OR gate 251 is the increment-decrement detect FF or 00 signal. Since the sub-unit of information comprises eight binary bits, it is current practice to identify adjacent groups of four bits as a hexadecimal notation. A hexadecimal F is all ones in four positions. Accordingly, the increment/decrement detect FF00 signal indicates that the MDB 16 byte 2 contained FF before incrementing or 00 before decrementing. This information is necessary because it indicates that there will be a carry out of byte 2, and byte 1 will be affected as will be explained hereinafter. The output signal from the OR gate 251 is applied to a plurality of AND gates 253 and 254. The AND gates 253 and 254 provide an input to an OR gate 255. The AND gates 253 and 254 and the OR gate 255 comprises a first enabling circuit 256. A second enabling circuit 257 comprises a pair of input AND gates 258 and 259 and an output OR gate 260. It is the function of the enabling circuits 256 and 257 to control the transfer of the altered sub-unit of address information into an identified destination register. Circuit 256 controls byte 1 destinations while circuit 257 controls byte 2 destinations.

The AND gate 253 is equipped with a plurality of input signals, the first of which is the negative 0 bit carry signal from the ALU 25, which signal indicates that a carry from the 0 bit position of the ALU is available; the second of which is a plus complement signal from the ALU, which indicates that an increment function is being performed; the third of which is the output from the OR gate 251 which in the case of an increment points out the fact that byte 2 contained FF before incrementing; and the fourth of which is the storage 1 cycle or arithmetic word enabling signal, which indicates that it is a proper portion of a storage word or arithmetical word during which the enabling is to be performed. Circuit 254 is equipped with a plurality of inputs, the first of which is the storage 1 cycle or arithmetic word enabling signal, the second of which is the output of the OR gate 251 which in the case of a decrement points out the fact that byte 2 contained 00 before decrementing, the third of which is the positive zero bit carry signal from the ALU 25 which indicates there is no carry out of the 0 bit position of the ALU, and the fourth of which is the negative complement signal which indicates that a decrement is being performed The AND gates 258 and 259 act in the same manner as their byte 1 control counterparts 253 and 254 with the exception that they have no dependence on the output of OR gate 251. This is so because the determining factor in byte 2 destinations is the carry out of the ALU 25. In summary, it can be seen that the AND-OR circuit 256 is used to control byte 1 destinations while the AND-OR circuit 257 is used to control byte 2 destinations. Also, the AND circuits 253 and 258 are used when incrementing while the AND circuits 254 and 259 are used when decrementing.

It is the function of a plurality of destination latches 262 through 265 to accumulate byte selection signals from a plurality of sources in order to effectively control the gating of the output of the sub-unit assembler 14, which temporarily stores the address portion generated by the I/D's 51*a* and 51*b* abong with the output of the ALU, into the destination register. Each of the destination latches 262 to 265 is similarly constructed, comprising a plurality of input AND gates 267 through 269 and an output OR gate 270. For the purposes of this case, only the circuit 267 portions of destination latches 262 through 265 need be considered. It is through this circuit 267 that the proper byte destination information is latched up for the address modification operation. AND gate 267 comprises a plurality of inputs, the first of which is the output of an inverter 275, the second of which is the 8–9 timing from the clock circuit, and the third of which originates from a plurality of OR circuits 287 through 290 respectively. The output of the inverter 275 provides the set control pulse to the latch which is the polarity hold type. The inverter 275 is set from an OR circuit 276 which is equipped with a plurality of input signals, the first of which is the output of a circuit 277, the second of which is the output of a circuit 281, and the third of which is the output of a circuit 286. It is the circuit 281 which provides the enabling signal which is used for the case in question. The AND gate 281 comprises a plurality of inputs, the first of which is the positive output of an AND-OR circuit 282, the second of which is the not Arithmetic A destination decode which denotes that the control word decode is not of the type which calls for the A Source address in an arithmetic word to be used as a destination address and the third of which is the 6–7–8 time signal from the clock circuit. The AND-OR circuit 282 is made up of a pair of AND circuits 283 and 284 and an OR circuit 285. For this case, it is necessary to prove that neither the circuit 283 nor the circuit 284 is enabled for the address modification case. The input to the circuit 283 is the Branch set-reset decode 0 signal which indicates a control decode for the Branch word. Since Address Modification takes place only in Storage words, we can be sure that the circuit 283 is not enabled. The circuit 284 has a plurality of inputs, the first of which is the minus C register byte 0 bit 0 signal, the second of which is the minus C register byte 0 bit 2 signal, and the third of which is the minus C register byte 0 bit 3 signal. The decode of these three bits on a current control word indicates a particular mode of the Arithmetic word. Clearly then the circuit 284 would not be enabled during a storage work. In summary, it is necessary to show how the destination latches 262 through 265 are set through the circuit 267. The first input to the circuit 267 is satisfied because of a chain of events which starts with neither the circuit 283 nor the circuit 284 being enabled which in turn allows the circuit 281 to conduct at 6–7–8 time. This action allows the OR 276 to be satisfied which in turn conditions the inverter 275 to allow the circuit 267 to be set at 6–7–8 time. The second input to the circuit 267 is the 8–9 timing signal from the clock circuit which further limits when the destination latches 262 through 265 can be set. Hence setting the latches 262 through 265 now hinges on conditions present in a plurality of OR circuits 287 through 290.

The OR gates 287 through 290 are equipped with a plurality of input signals which sense the controllable conditions upon which, or in response to which, certain sub-units of the address are selectively gated into the destination register. For the purposes of our description, it is the output signals from the circuits 256 and 257 which are described in detail and which are employed for selecting the correct input to the destination register from bytes 1 and 2 of the MDB 16. Since the address being described comprises 3 sub-units of information and since the byte 3 is automatically gated by the destination latch 265, the only unknowns are the inputs to the OR gates 288 and 289.

The output from the circuit 256 is applied to an OR gate 291. The OR gate 291 has a conditional input signal of a BRANCH AND LINK enabling signal on the line 292. The output from the OR gate 291 forms the input to the OR gate 288. The output from the circuit 257 provides an input signal to an OR gate 293 which is additionally equipped with the BRANCH AND LINK signal on the line 292. The output from the OR gate 293 is applied to the OR gate 289. The automatic gating of byte 3 is performed by an OR gate 294, which has as one of its input signals the ARITHMETIC OR STORAGE WORD enabling signal on a line 295. It is the decoding of every arithmetic or storage word which causes the signal on the line 295 to become enabling and thereby sets destination latch 265 which in turn gates sub-unit 3 into the destination register.

Figure 3F:
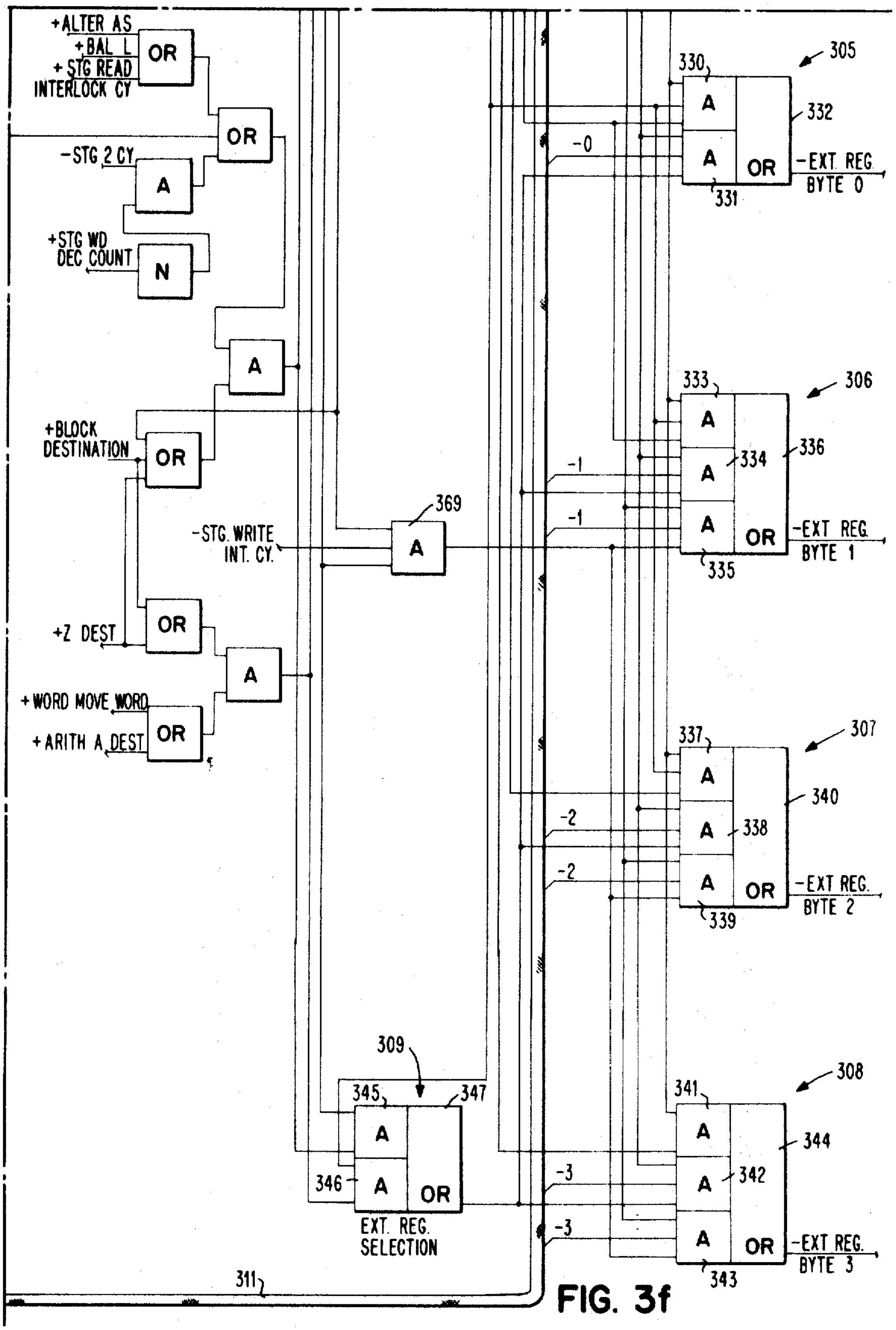

The destination register can be located in either the active storage unit 17 shown in FIG. 1 or the external register array 53. The active storage unit 17 is shown in greater detail with reference to FIGS. 2*k*, 2*l*, and 2*m*. The active storage store control circuits **166*a* through 166*d*** are shown in greater detail on FIG. 3*c*. As a matter of design, the register within the active storage device 17 comprises four byte size memory modules. Obviously, other configurations can be employed. However, as a matter within the scope of the invention, each byte mechanism has its own store control. An individual byte control store mechanism is required since it is a unit or a byte which is modified by either the ALU, I/D **51*a* or the I/D 51*b*. Individual byte control is required in determining what portion of the address is to be selected for gating into the destination register. The external register array is not shown in detail since it is a separate set of registers identical with that shown for the active storage device 17**. The only difference being that a separate store control circuit is required and which store control circuits are shown in FIG. 3*f* as 305, 306, 307, and 308. The registers themselves are responsive to the output from the store control circuits 305 through 308. Selection between the active storage gating circuits **166*a* through 166*d* and the external register gate circuits 305 through 308 is made by an external register destination selection circuit 309**, shown in FIG. 3*f*, and an active storage destination selection circuit 310, shown in FIG. 3*c*. The circuit 309 is activated by enabling signals from the control register decode circuit **9*b* which indicate that the destination will be an external register. This information is assembled from the decodes which relate whether the external destination was called out in byte 1 of the control register 9*a* or byte 2 of the control register 9*a*. The circuit 345 handles the byte 1 case while the circuit 346 handles the byte 2 case. The circuit 310 is also activated by enabling signals from the control register decode 9*b* indicating that the destination will be in active storage. In this case it is recognized that the destination is not an external register, hence it must be in active storage 17. These controls are also broken into bytes as in the case of externals. Circuit 348 handles the byte 1 case and circuit 349 handles the byte 2** case.

The output signals from the destination latches 262 through 265 are applied equally to the active storage gates **166*a* through 166*d* and the external register store circuits 305 through 308 by a bus 311. The corresponding selection signals are labeled as they apply to bytes 0 through bytes 3. Each stage of the active storage store control circuits and the external register store control circuits comprise a plurality of input AND gates and an output OR gate. The store control circuit 166*a* comprises a pair of input AND gates 315 and 316 and an output OR gate 317. The store control circuit 166*b* comprises a plurality of input AND gates 318 through 320 and an output OR gate 321. The store control circuit 166*c* comprises a plurality of input AND gates 322 through 324 and an output OR gate 325. The store control circuit 166*d* comprises a plurality of input AND gates 326 through 328 and an output OR gate 329. The store control circuit 305 comprises a pair of input AND gates 330 and 331 and an output OR gate 332. The store control circuit 306 comprises a plurality of input AND gates 333 through 335 and an output OR gate 336. The store control circuit 307 comprises a plurality of input AND gates 337 through 339 and an output OR gate 340. The store control circuit 308 comprises a plurality of input AND gates 341 through 343 and an output OR gate 344. The external register selection circuit 309 comprises a plurality of input AND gates 345 and 346 and an output OR gate 347. The active storage destination selection circuit 310 comprises a plurality of input AND gates 348 and 349 and an output OR gate 350**.

To summarize, circuits **166*a* through 166*d* are employed as active storage destination gates under the control of the active storage destination selection circuit 310. Circuits 305 through 308 are employed as external register destination gates under the control of the external register destination selection circuit 309. Thus, if the destination register is contained within active storage 17, gates 166*a* through 166*d* control which byte or bytes of the MDB 16 are written into the active storage destination register. If the destination register is contained within the external register array 53, gates 305 through 308 control which byte or bytes of the MDB 16** are written into the external register array destination register.

The output on the bus 311 can be alternatively applied to the store gates **116*a* through 166*d* or the store gates 305 through 308. However, according to the identification of either an active storage register or an external register, the corresponding circuits 309 and 310** are active in the following manner.

The general operation of the invention is described with reference to the timing description shown in FIGS. 4*a* and 4*b*. A more detailed description of a storage addressing mechanism having plural addressing paths can be obtained by reference to a previously filed application entitled "Storage Addressing Mechanism Having Plural Address Generating Paths" in the name of W. P. Hanf et al. Ser. No. 670,917, filed Sept. 27, 1967, and assigned to the assignee of the present invention. Since the present invention can operate in both the increment and decrement mode, the address in question can be modified by increasing or decreasing the address. Therefore, both an increment and decrement mode is hereinafter described. Further variables include a carry or no-carry from the ALU or a detect 00FF from the increment/decrement circuit **51*b*. To briefly review the contents of the just beforementioned patent application, it is the function of that device to operate in response to control words having a source address, a destination address, and direction indicia. The source address by using techniques described in a further application identified as "Improved Data Handling System Employing a Full Word Main Memory Transfer With Individual Indirect Byte Addressing and Processing" in the name of K. K. Womack, Ser. No. 670,918, filed Sept. 27, 1967, and assigned to the assignee of the present invention, including the active storage registers 17 or the external register array 53 to furnish a 3 byte or 24 bit address for application to the register 40 for identifying location in main storage 2. The destination portion of the control word using techniques of the just above-mentioned application identifies a register in either active storage 17 or a register in the external register array 53. In a read operation, the identified data is transferred from main storage to either the active storage or external register. In a write operation, information flows from the identified active storage register or external register to the identified main storage register. Accordingly, in a write mode of operation, the source of the main storage address is retrieved from a local active storage register and external register and is transiently available on the output sense amplifiers of the respective circuits. This address indicia is set into the word assembler 10 at 1–2 time and transferred to the output of the unit assembler 14 at 2–3 time. At this moment, the contents of the main data bus byte 3 as shown in line D is transferred into the A register and the contents of the main data bus byte 2 is transferred into the incrementer/decrementer 51*b* and the contents of the main data bus byte 1 is transferred into the incrementer/decrementer 51*a*, as shown on lines E and F. The modification is performed and with the contents of the constant field of the current control word as the constant field is transferred into the B register 23** as indicated on line G. The modification progresses according to the circuitry shown in FIGS. 3*a* through 3*f* and the destination latches 262 through 265 are set at 8–9 time of stage 1 cycle to indicate which bytes are to be destined. At 9 time the output from the incrementer/decrementer **51*a* and 51*b* and the ALU 25 is available and it is switchably transferred to the main data bus 16. During the storage 2 cycle of the wirte word the contents of the main data bus 16 is written into the register from which the address was originally retrieved under control of store gates 166*a* through 166*d* of active storage or 305 through 309** if external. This, of course, is the updated address so as to access the next consecutively placed data word. Referring to FIG. 4*b*, the storage read word is divided into storage 1 cycle and a storage 2 cycle and comprises as many individual timing signals as the storage write word. During 0–1 time the identified active storage or external storage register is addressed by the source address indicia in the current control word, the contents therein are retrieved and set into the word assembler 12 by normal accessing mechanisms as indicated on line J. The contents of the main data bus is applied to its corresponding mechanism for address modification, namely the A register 21 and the incrementer/decrementers **51*a* and 51*b*. The constant portion of the current control word is shifted into the B register 23 during 2–3 time as shown on line L. The modification process is completed during 4–5 time and the outputs from the ALU and the incrementer/decrementers are applied to the word assembler during 6–7–8 time as indicated on line J. The switching and transferring operation occurs during the period 6–7–8 time and the results are available on the main data bus 16 during 8–9 time as shown on line I during which time the now-modified address is written back into the identified active storage register or external register under control of circuits 166*a* through 166*b* if active storage or 305 through 308** if external.

Figure 4A:
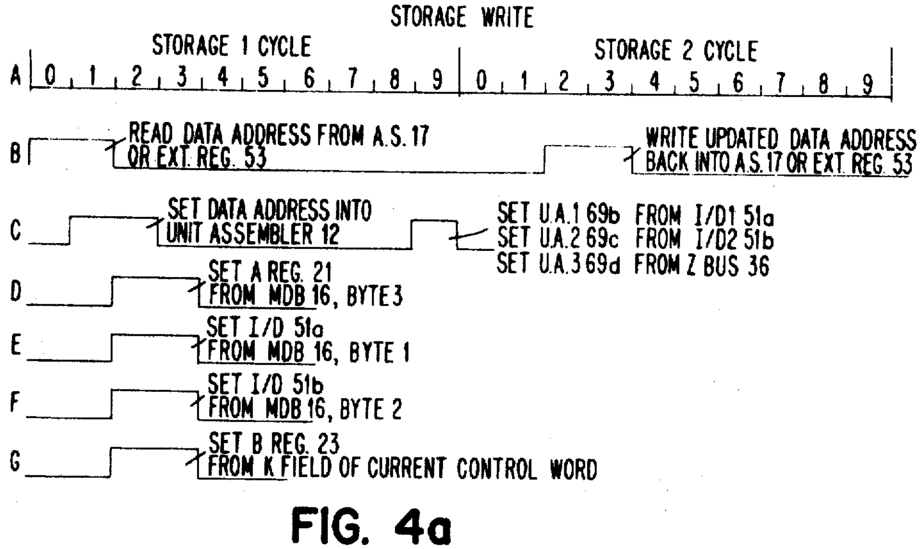
FIGS. 4*a* and 4*b* shows the timing of an address modification cycle for a Storage Write cycle and a Storage Read cycle respectively.
Figure 4B:
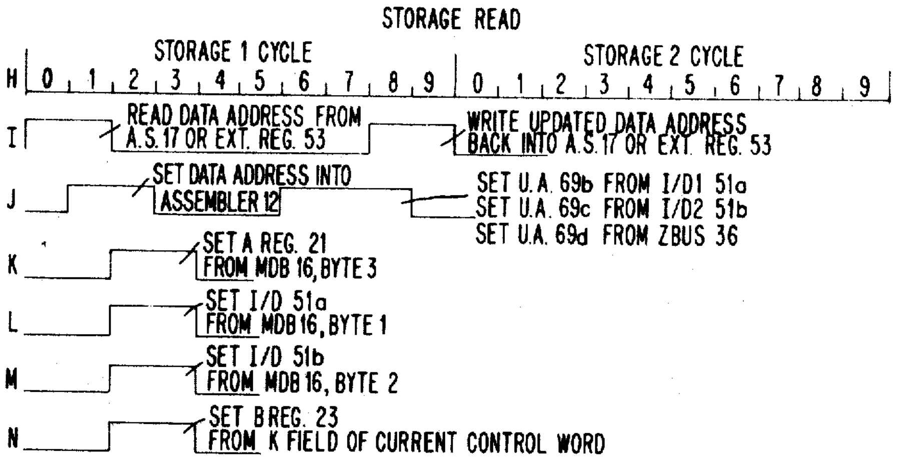

As shown in FIG. 4*a*, destination of the updated address occurs at 2–3 time of storage 2 cycle for a storage write word. FIG. 4*b* shows the destination of the updated address occurring at 8–9 time of storage 1 cycle for a storage read word. For the case of the storage write word, the AND gates 320, 324 and 328 handle the destination store gates for byte 1, 2 and 3 of active storage 17 respectively. The circuits 320, 324 and 328 have two common inputs, the first of which is the 3 time signal from the clock, the second of which is the output of an AND circuit 367. The AND circuit 367 is equipped with a plurality of inputs, the first of which is the output of an AND circuit 368 which is a blocking signal made up of various signals from the C register decode circuit **9*b*, the second of which is the storage write interlock cycle from the C register decode circuit 9*b*, and the third of which is the not byte 1 address is an external signal. The circuit 320 has a third input from the bus 311 in the form of the output from the destination byte 1 latch 263. The circuit 324 has a third input from the bus 311 in the form of the output from the destination byte 2 latch 264. The circuit 328 has a third input from the bus 311 in the form of the output from the destination byte 3 latch 265**.

For the case of the storage write word, the AND gates 335, 339 and 343 handle the destination store gates for byte 1, 2 and 3 of the external storage array 53 respectively. The circuits 335, 339 and 343 have two common inputs, the first of which is the 3 time signal from the clock, the second of which is the output of an AND circuit 369. The AND circuit 369 is equipped with a plurality of inputs, the first of which is the output of an AND circuit 368 which is a blocking signal made up of various signals from the C register decode circuit **9*b*, the second of which is the storage write interlock cycle from the C register decode circuit 9*b*, and the third of which is the byte 1 address is an external signal. The circuit 335 has a third input from the bus 311 in the form of the output from the destination byte 1 latch 263. The circuit 339 has a third input from the bus 311 in the form of the output from the destination byte 2 latch 264. The circuit 343 has a third input from the bus 311 in the form of the output from the destination byte 3 latch 265**.

For the case of the storage read word, the AND gates 319, 323 and 327 handle the destination store gates for byte 1, 2 and 3 of active storage 17 respectively. The circuits 319, 323 and 327 have two common inputs, the first of which is the 9 time signal from the clock, the second of which is the output of the circuit 310 previously described. The circuit 319 has a third input from the bus 311 in the form of the output from the destination byte 1 latch 263. The circuit 323 has a third input from the bus 311 in the form of the output from the destination byte 2 latch 264. The circuit 327 has a third input from the bus 311 in the form of the output from the destination byte 3 latch 265.

For the case of the storage read word, the AND gates 334, 338 and 342 handle the destination store gates for bytes 1, 2 and 3 of the external register array 53 respectively. The circuits 334, 338 and 342 have two common inputs, the first of which is the 9 time signal from the clock, the second of which is the output of the circuit 309 previously described. The circuit 334 has a third input from the bus 311 in the form of the output from the destination byte 1 latch 263. The circuit 338 has a third input from the bus 311 in the form of the output from the destination byte 2 latch 264. The circuit 342 has a third input from the bus 311 in the form of the output from the destination byte 3 latch 265.

The selection of the bytes for transfer from the ALU 25 and the incremeter/decrementers **51*a* and 51*b* is performed in the following manner. Byte 3 for the main data bus 3** is always destined. The circuitry which controls this action was previously described on page 24.

For the incrementing case, if there is a carry out of the ALU indicating that the capacity of the byte being processed by the ALU exceeds the all 1 condition, it is necessary to destine byte 2 in addition to byte 3. This is accomplished by the AND circuit 258 in the following manner. The minus 0 bit carry from the ALU signal indicates a carry out of the ALU, the not complement signal implies increment as previously described, and the storage word decode is active in this case. Hence the circuit 258 is active which in turn activates the OR gates 293 and 289. The OR gate 289 sets the byte 2 destination latch 264 as previously described. This action causes a destination signal to be available as the negative 2 output signal for application to the bus 311. This signal is applied to the circuit 166*c* if the destination is in active storage 17 or to circuit 307 if the destination is in the external register array 53.

For the decrementing case, if there is no carry out of the ALU which indicates that the all zeros to all ones transition has occurred, it is necessary to destine byte 2 in addition to byte 3. This is accomplished by AND circuit 259 in a manner similar to the action of AND circuit 258 previously described.

For the incrementing case, if there is a carry out of the ALU, and the incrementer/decrementer 51*b* equals FF in hexidecimal notation before updating, it is necessary to destine byte 1 of the main data bus 16 in addition to selecting bytes 2 and 3 of the main data bus 16. This is performed by a signal from incrementer/decrementer 51*b* on a line 355 to be applied to the AND gate 253. The AND gate 253 is additionally enabled by the plus complement signal from the ALU 25, the zero bit carry from the ALU input signal and the negative storage 1 cycle or arithmetic word decode signal from decode circuit 9*b*. Thus the AND gate 253 conducts and generates an output signal from the OR gate 255. The output of OR gate 255 is applied as an input to the OR gate 291 for eventual transmission to the AND gate 267 in the byte 1 destination latch 262. This action causes a destination signal to be available as the negative 1 output signal for application to the bus 311. This signal is applied to the circuit 166*b* if the destination is in the active storage 17 or to the circuit 306 if the destination is in the external register array 53.

For the decrementing case, if there is no carry out of the ALU, and incrementer/decrementer 51*b* equals 00 in hexidecimal notation before updating, it is necessary to destine byte 1 in addition to bytes 2 and 3. This is accomplished by the AND circuit 254 in a manner similar to the action of the AND circuit 253 previously described.

While the invention has been particularly shown and described with reference to a preferred embodiment thereof, it will be understood by those skilled in the art that various changes in form and details may be made therein without departing from the spirit and scope of the invention.

What is claimed is:

1. In a data handling system, the combination comprising, a store having a plurality of selectable storage units, each unit being comprised of a plurality of sub-units and first signal controlled selection means for accessing a chosen combination of said sub-units, said accessed sub-units being employed for storing address indicia, a plurality of modification means, each connected and responsive to a corresponding one of said accessed sub-units, a first of said modification means being effective to alter said applied sub-unit by a selectable and variable amount, the remaining ones of said modification means being effective to alter said associated applied sub-unit by a predetermined amount, address condition sensing means responsive to respective sub-units applied to said remaining ones of said modification means for indicating a predetermined address configuration, address modification sensing means connected to said first modification means for producing a signal indicative of the presence or absence of a carry from said first modification means, first store control means for invariable rewriting the altered sub-unit from said first modification means into said chosen combination of sub-units, second store control means associated with the next higher order one of said remaining ones of said modification means, responsive to said signal indicative of the presence or absence of a carry from said address modification sensing means for selecting the applied or altered sub-unit for rewriting into said combination of accessed sub-units, and third store control means associated with all of the next higher order ones of said remaining modification means, responsive to said modification sensing means and said address condition sensing means of all lower order ones of said remaining ones of said modification means for selecting the applied or altered sub-unit for rewriting into said chosen combination of sub-units in said store.

References Cited

UNITED STATES PATENTS

| | | | |
|---|---|---|---|
| 3,387,283 | 6/1968 | Snedaker | 340—172.5 |
| 3,431,558 | 3/1969 | Capozzi | 340—172.5 |
| 3,432,810 | 3/1969 | Cordero | 340—172.5 |
| 3,435,420 | 3/1969 | Wissick | 340—172.5 |

PAUL J. HENON, Primary Examiner

R. F. CHAPURAN, Assistant Examiner